(12) United States Patent
Gunnalan et al.

(10) Patent No.: US 10,244,003 B2
(45) Date of Patent: Mar. 26, 2019

(54) MEDIA SESSION BETWEEN NETWORK ENDPOINTS

(71) Applicant: Microsoft Technology Licensing, LLC, Redmond, WA (US)

(72) Inventors: Rajesh Gunnalan, Sammamish, WA (US); Humayun Mukhtar Khan, Issaquah, WA (US); Timothy M. Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/497,058

(22) Filed: Sep. 25, 2014

(65) Prior Publication Data
US 2016/0094586 A1 Mar. 31, 2016

(51) Int. Cl.
| | |
|---|---|
| *H04L 29/06* | (2006.01) |
| *H04L 29/12* | (2006.01) |
| *H04L 12/721* | (2013.01) |
| *H04L 12/723* | (2013.01) |
| *H04L 12/751* | (2013.01) |

(52) U.S. Cl.
CPC ........ *H04L 65/1006* (2013.01); *H04L 45/123* (2013.01); *H04L 61/256* (2013.01); *H04L 61/2564* (2013.01); *H04L 65/1059* (2013.01); *H04L 65/1069* (2013.01);
(Continued)

(58) Field of Classification Search
None
See application file for complete search history.

(56) References Cited

U.S. PATENT DOCUMENTS

| | | | |
|---|---|---|---|
| 6,115,580 | A | 9/2000 | Chuprun et al. |
| 7,788,383 | B2 | 8/2010 | Andreasen |

(Continued)

FOREIGN PATENT DOCUMENTS

| | | |
|---|---|---|
| CA | 2591183 | 12/2008 |
| CN | 102685268 | 9/2012 |

(Continued)

OTHER PUBLICATIONS

"Non-Final Office Action", U.S. Appl. No. 14/497,141, dated Jun. 6, 2016, 16 pages.

(Continued)

*Primary Examiner* — Greg C Bengzon
(74) *Attorney, Agent, or Firm* — Schwegman Lundberg & Woessner, P.A.

(57) ABSTRACT

A media session between an initiating endpoint and a responding endpoint is effected, there being a plurality of available paths through a communication network via which the media session could be established. Type metrics associated with the available paths convey the directness of the available paths and are for making a selection of an available path for the media session. Network information indicative of the quality of the available paths and collected from a plurality of network nodes comprises contributions from network nodes other than the initiating and receiving endpoints which have current and/or have past visibility of at least parts of the available paths. Said selection is influenced so as to cause the endpoints to select for the media session a higher quality but less direct available path in favor of a more direct but lower quality available path.

21 Claims, 10 Drawing Sheets

(52) U.S. Cl.
CPC .......... *H04L 65/1083* (2013.01); *H04L 45/02* (2013.01); *H04L 45/124* (2013.01); *H04L 45/50* (2013.01)

(56) References Cited

U.S. PATENT DOCUMENTS

| | | | |
|---|---|---|---|
| 7,796,620 B2 | 9/2010 | Elwell | |
| 7,843,843 B1* | 11/2010 | Papp, III | H04L 41/5009 370/252 |
| 7,885,278 B2 | 2/2011 | Zhu | |
| 7,912,040 B2 | 3/2011 | Wright | |
| 7,941,551 B2 | 5/2011 | Anantharaman et al. | |
| 7,953,010 B2 | 5/2011 | Rodrig | |
| 8,060,626 B2 | 11/2011 | Roy et al. | |
| 8,099,500 B2 | 1/2012 | Deason | |
| 8,185,615 B1* | 5/2012 | McDysan | H04L 29/06 370/229 |
| 8,289,845 B1* | 10/2012 | Baldonado | H04L 43/16 370/229 |
| 8,312,169 B2 | 11/2012 | Perumal et al. | |
| 8,325,741 B2 | 12/2012 | Zhu | |
| 8,356,344 B2 | 1/2013 | Lin et al. | |
| 8,363,744 B2 | 1/2013 | Agee et al. | |
| 8,385,326 B2 | 2/2013 | Khan et al. | |
| 8,432,896 B2 | 4/2013 | Foster et al. | |
| 8,526,334 B2 | 9/2013 | Constantinescu | |
| 8,601,144 B1* | 12/2013 | Ryner | G06F 21/45 709/228 |
| 8,601,155 B2 | 12/2013 | Toombs et al. | |
| 8,639,844 B2 | 1/2014 | Kumarasamy et al. | |
| 8,644,164 B2 | 2/2014 | Averi et al. | |
| 8,699,366 B2 | 4/2014 | Rodrig | |
| 8,725,885 B1 | 5/2014 | Ryner | |
| 8,767,716 B2 | 7/2014 | Trabelsi et al. | |
| 8,867,553 B2 | 10/2014 | Eronen et al. | |
| 8,885,463 B1* | 11/2014 | Medved | H04L 45/50 370/228 |
| 8,917,311 B1 | 12/2014 | Yang et al. | |
| 8,977,730 B2 | 3/2015 | Nagpal et al. | |
| 8,982,708 B1 | 3/2015 | McCabe et al. | |
| 9,178,801 B1* | 11/2015 | Guichard | H04L 12/6418 |
| 9,203,872 B2 | 12/2015 | Gunnalan et al. | |
| 9,450,817 B1* | 9/2016 | Bahadur | H04L 45/64 |
| 9,596,272 B2 | 3/2017 | Gunnalan et al. | |
| 9,813,346 B2* | 11/2017 | Pedersen | H04L 45/24 |
| 9,819,540 B1* | 11/2017 | Bahadur | H04L 45/64 |
| 2003/0185233 A1* | 10/2003 | Ji | H04L 12/5692 370/466 |
| 2004/0136324 A1* | 7/2004 | Steinberg | H04L 12/5692 370/238 |
| 2004/0156313 A1* | 8/2004 | Hofmeister | H04L 12/4633 370/229 |
| 2006/0104199 A1* | 5/2006 | Katukam | H04L 12/43 370/216 |
| 2007/0002740 A1* | 1/2007 | Evans | H04L 45/20 370/230.1 |
| 2007/0091804 A1* | 4/2007 | Pan | H04L 45/00 370/230 |
| 2008/0043716 A1* | 2/2008 | Toombs | H04L 45/00 370/351 |
| 2008/0080568 A1 | 4/2008 | Hughes et al. | |
| 2008/0186852 A1* | 8/2008 | Sami | H04L 45/00 370/235 |
| 2008/0304419 A1 | 12/2008 | Cooper et al. | |
| 2009/0201937 A1* | 8/2009 | Bragg | H04L 12/4625 370/401 |
| 2009/0245234 A1 | 10/2009 | Parameswar et al. | |
| 2010/0027418 A1* | 2/2010 | Rodrig | H04L 41/147 370/235 |
| 2010/0165976 A1 | 7/2010 | Khan et al. | |
| 2010/0205653 A1 | 8/2010 | Eronen et al. | |
| 2010/0217874 A1 | 8/2010 | Anantharaman et al. | |
| 2010/0293297 A1* | 11/2010 | Perumal | H04L 29/12528 709/245 |
| 2011/0013517 A1* | 1/2011 | So | H04L 45/04 370/238 |
| 2011/0194421 A1 | 8/2011 | Rodrig | |
| 2011/0208802 A1 | 8/2011 | Gunnalan et al. | |
| 2011/0276699 A1* | 11/2011 | Pedersen | H04L 45/24 709/227 |
| 2012/0047270 A1 | 2/2012 | Chandrasekaran | |
| 2012/0158974 A1 | 6/2012 | Perumal et al. | |
| 2013/0185440 A1* | 7/2013 | Blau | H04L 61/2589 709/227 |
| 2014/0024383 A1* | 1/2014 | Rahman | H04W 28/0268 455/445 |
| 2014/0029462 A1 | 1/2014 | Stewart | |
| 2014/0047066 A1* | 2/2014 | Pan | H04L 45/00 709/217 |
| 2014/0082217 A1 | 3/2014 | Lohner et al. | |
| 2014/0136718 A1* | 5/2014 | Menezes | H04L 47/2408 709/227 |
| 2014/0150075 A1 | 5/2014 | Ryner | |
| 2014/0169170 A1* | 6/2014 | Almog | H04L 47/32 370/235 |
| 2014/0269728 A1* | 9/2014 | Jalan | H04L 45/306 370/392 |
| 2015/0023174 A1* | 1/2015 | Dasgupta | H04L 47/24 370/236 |
| 2015/0030016 A1 | 1/2015 | Larkin | |
| 2015/0188882 A1 | 7/2015 | Wang et al. | |
| 2015/0207675 A1* | 7/2015 | Hayashi | H04L 45/38 370/225 |
| 2015/0281642 A1 | 10/2015 | Yang et al. | |
| 2016/0006672 A1* | 1/2016 | Saavedra | H04L 49/00 370/401 |
| 2016/0043943 A1* | 2/2016 | Pan | H04L 45/00 370/235 |
| 2016/0072669 A1* | 3/2016 | Saavedra | H04L 12/2867 709/220 |
| 2016/0080502 A1* | 3/2016 | Yadav | H04L 41/12 709/227 |
| 2016/0094586 A1* | 3/2016 | Gunnalan | H04L 45/123 709/228 |
| 2016/0094589 A1 | 3/2016 | Gunnalan et al. | |
| 2016/0094591 A1 | 3/2016 | Moore et al. | |
| 2016/0164787 A1* | 6/2016 | Roach | H04L 47/125 370/235 |
| 2016/0174239 A1 | 6/2016 | Tietsch et al. | |
| 2016/0315808 A1* | 10/2016 | Saavedra | H04L 47/24 |
| 2017/0142164 A1 | 5/2017 | Moore et al. | |
| 2017/0142165 A1 | 5/2017 | Moore et al. | |
| 2018/0102970 A1* | 4/2018 | Pan | H04L 45/00 |

FOREIGN PATENT DOCUMENTS

| | | |
|---|---|---|
| EP | 2001204 | 12/2008 |
| WO | WO-2009058640 | 5/2009 |
| WO | WO-2010082982 | 7/2010 |

OTHER PUBLICATIONS

"[MS-ICE2]: Interactive Connectivity Establishment (ICE) Extensions 2.0", Available at: https://msdn.microsoft.com/en-us/library/office/cc431504(v=office.12).aspx, Sep. 4, 2015, 40 pages.

"Cisco Jabber Video for TelePresence", Available at: http://www.cisco.com/c/dam/en/us/td/docs/telepresence/endpoint/movi/admin_guide/JabberVideo_Admin_Guide_4-4.pdf, Feb. 2012, 36 pages.

"Interactive Connectivity Establishment (ICE) 2.0 Bandwidth Management Extensions", Retrieved from the Internet: URL:http://download.microsoft.com/download/1/6/F/16F4E321-AA6B-4FA3-8AD3-E94C895A3C97/OfficeProto.zip, Sep. 4, 2015, 31 pages.

"International Search Report and Written Opinion", Application No. PCT/US22015/051972, dated Dec. 23, 2015, 12 pages.

"International Search Report and Written Opinion", Application No. PCT/US2015/051940, dated Dec. 14, 2015, 13 pages.

"Traversal using Relay NAT (TURN) Bandwidth Management Extensions", Retrieved from the Internet: URL:http://download.microsoft.com/download/1/6/F/16F4E321-AA6B-4FA3-8AD3-E94C895A3C97/OfficeProto.zip, Sep. 4, 2015, 48 pages.

(56) References Cited

OTHER PUBLICATIONS

Ciminiera, "Distributed Connectivity Service for a SIP Infrastructure", In Journal of IEEE Network, vol. 22, Issue 5, Sep. 2008, pp. 33-40.
Dowling, "Improving ICE Service Selection in a P2P System using the Gradient Topology", In Proceedings of First International Conference on Self-Adaptive and Self-Organizing Systems, Jul. 9, 2007, 4 pages.
Reddy, "Happy Eyeballs Extension for ICE", Available at: https://tools.ietf.org/html/draft-reddy-mmusic-ice-happy-eyeballs-00, Oct. 4, 2012, 10 pages.
Rosenberg, "Interactive Connectivity Establishment (ICE): A Protocol for Network Address Translator (NAT) Traversal for Offer/Answer Protocols", Available at: https://www.rfc-editor.org/rfc/pdfrfc/rfc5245.txt.pdf, Apr. 2010, 117 pages.
Thomson, "Using Interactive Connectivity Establishment (ICE) in Web Real-Time Communications (WebRTC)", Available at: https://tools.ietf.org/html/draft-thomson-mmusic-ice-webrtc-01#section-2.1.1, Oct. 19, 2013, 18 pages.
Yuan, "iVoIP: an Intelligent Bandwidth Management Scheme for VoIP in WLANs", In Journal of Wireless Networks, vol. 20, Issue 3, Apr. 2014, 29 pages.
"Interactive Connectivity Establishment (ICE) Extensions 2.0—1.3 Overview", Retrieved From: <http://msdn.microsoft.com/en-us/library/dd923690(v=office.12).aspx> Dec. 24, 2014, 2014, 3 pages.
"[MS-ICE2]: Interactive Connectivity Establishment (ICE) Extensions 2.0", Available at: <http://download.microsoft.com/download/1/6/F/16F4E321-AA6B-4FA3-8AD3-E94C895A3C97/[MS-ICE2].pdf>:, Feb. 10, 2014, 40 pages.
Andersson, "Network Address Translator Traversal for the Peer-to-Peer Session Initiation Protocol on Mobile Phones", Proceedings: In Master's Thesis, Aalto University School of Science and Technology Available at: <http://lib.tkk.fi/Dipl/2010/urn100205.pdf>, May 10, 2010, 118 pages.
Camarillo, et al., "Automatic Flow-Specific Multi-Path Management for the Host Identity Protocol (HIP)", In Proceedings of IEEE Wireless Communications and Networking Conference, Apr. 18, 2010, 6 pages.
Keranen, "Host Identity Protocol-based Network Address Translator Traversal in Peer-to-Peer Environments", Proceedings: In Master's Thesis, Helsinki University of Technology Available at: <http://lib.tkk.fi/Dipl/2008/urn012452.pdf>, Sep. 8, 2008, 103 pages.
Lane, et al., "Path Brokering for End-Host Path Selection: Toward a Path-Centric Billing Method for a Multipath Internet", In Proceedings of the ACM CoNEXT Conference Article No. 69, Dec. 9, 2008, 6 pages.
Liang, et al., "TRECON: A Framework for Enforcing Trusted ISP Peering", In Proceedings of 15th International Conference on Computer Communications and Networks, Oct. 9, 2006, 7 pages.
Rosenberg, et al., "TCP Candidates with Interactive Connectivity Establishment (ICE) draft-ietf-mmusic-ice-tcp-12", Proceedings: In Internet-Drafts Available at: <http://64.170.98.42/pdf/draft-ietf-mmusic-ice-tcp-12.pdf>, Feb. 2, 2011, 29 pages.
Wang, et al., "A P2P-Grid Model for Traversing NAT in SIP Communication", In Proceedings of Ninth International Conference on Hybrid Intelligent Systems, vol. 3, Aug. 12, 2009, 4 pages.
"Non-Final Office Action", U.S. Appl. No. 14/945,293, dated Sep. 22, 2016, 20 pages.
"Second Written Opinion", Application No. PCT/US2015/051940, dated Aug. 8, 2016, 4 pages.
"International Preliminary Report on Patentability", Application No. PCT/US2015/051940, dated Jan. 10, 2017, 8 pages.
"Notice of Allowance", U.S. Appl. No. 14/497,141, dated Oct. 26, 2016, 10 pages.
"Final Office Action", U.S. Appl. No. 14/945,293, dated Mar. 27, 2017, 21 pages.
"International Search Report and Written Opinion", Application No. PCT/US2016/061770, dated Feb. 10, 2017, 13 pages.
"International Search Report and Written Opinion", Application No. PCT/US2016/061774, dated Feb. 3, 2017, 14 pages.
Rosenberg, "Session Traversal Utilities for NAT (STUN)", Network Working Group; Request for Comments: 5389; https://tools.ietf.org/html/rfc5389, Oct. 2008, 51 pages.
Tseng, "WiFi Assisted NAT Traversal Scheme for Surveillance Patrol Robot", Article in Nonlinear Dynamics 76(1), Mar. 6, 2013, 12 pages.
"International Preliminary Report on Patentability Issued in PCT Application No. PCT/US2016/061770", dated Jan. 24, 2018, 8 Pages.
"International Preliminary Report on Patentability Issued in PCT Application No. PCT/US2016/061774", dated Feb. 19, 2018, 10 Pages.
"Non-Final Office Action Issued in U.S. Appl. No. 14/945,280", dated Nov. 17, 2017, 31 Pages.
"Non-Final Office Action Issued in U.S. Appl. No. 14/945,302", dated Nov. 30, 2017, 27 Pages.
Rosenberg, J., "Interactive Connectivity Establishment (ICE): A Methodology for Network Address Translator (NAT) Traversal for Offer/Answer Protocols", [online]. Retrieved from the Internet: <URL: http://tools/ietf.org/html/draft-ietf-mmusic-ice-13>, (Jan. 16, 2007), 82 Pages.
"Non-Final Office Action", U.S. Appl. No. 14/945,293, dated Dec. 29, 2017, 19 pages.
"Second Written Opinion", Application No. PCT/US2016/061770, dated Oct. 19, 2017, 6 pages.
"Second Written Opinion", Application No. PCT/US2016/061774, dated Oct. 17, 2017, 9 pages.

\* cited by examiner

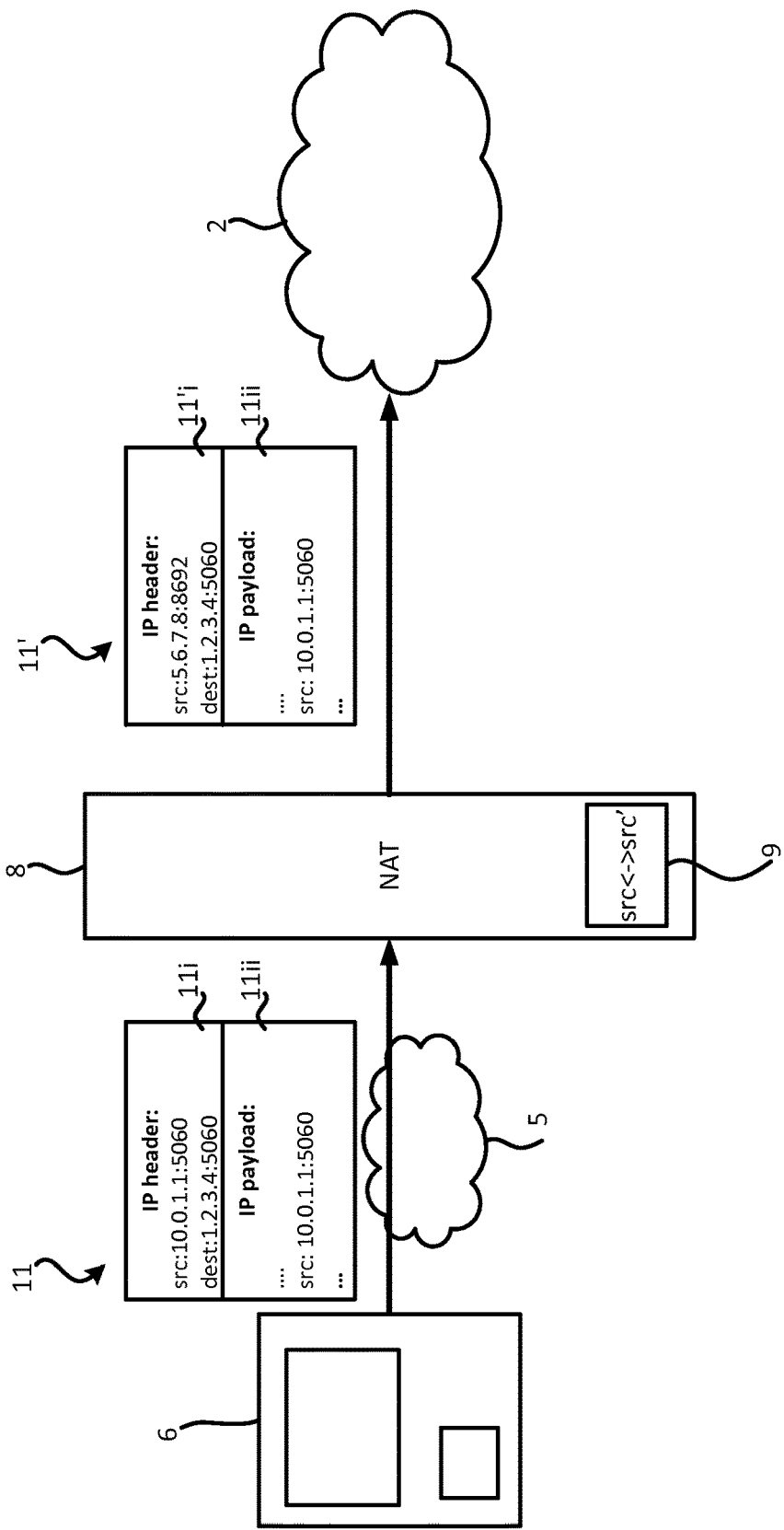

MEDIA SESSION BETWEEN NETWORK ENDPOINTS

BACKGROUND

A communication network typically includes different types of network nodes, such as user devices, routers, network address translators (NATs), media relay servers etc., which perform different functions within the network. Communication between two communicating nodes (endpoints, such as user devices) may be via other nodes of the network (intermediate nodes, such as routers, NATs and media relay servers). The network may have a layered architecture, whereby different logical layers provide different types of node-to-node communication services. Each layer is served by the layer immediately below that layer (other than the lowest layer) and provides services to the layer immediately above that layer (other than the highest layer). The network may be a packet-based network and/or an internet.

A media session may be established between two endpoints, such as user devices, connected via a communication network so that real-time media can be transmitted and received between those endpoints via the network. An example of a media session is a SIP ("Session Initiation Protocol") media session. The media session may be a Voice or Video over IP (VOIP) session, in which audio and/or video of a call is transmitted and received between the endpoints in the VOIP session. Endpoints and other types of network node may be identified by a network address (e.g. IP ("Internet Protocol") address), with the session being established between transport addresses associated with the endpoints. A transport address is a combination of a network address (e.g. IP address) and a port associated with that network address.

To establish the media session, one of the endpoints may transmit a media session request to the other endpoint. Herein, an endpoint that initiates a request for a media session (e.g. audio/video communications) is called an "initiating endpoint" or equivalently a "caller endpoint". An endpoint that receives and processes the communication request from the caller is called a "responding endpoint" or "callee endpoint". Each endpoint may have multiple associated transport addresses e.g. a local transport address, a transport address on the public side of a NAT, a transport address allocated on a relay server etc. During media session establishment, for each endpoint, a respective address is selected for that endpoint to use to transmit and receive data in the media session. For example, the addresses may be selected in accordance with the ICE ("Interactive Connectivity Establishment") protocol. Once the media session is established, media can flow between those selected addresses of the different endpoints.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the subject matter is directed to a method for effecting a media session between an initiating endpoint and a responding endpoint. The initiating and receiving endpoint are connected via a communication which includes network nodes, there being a plurality of available paths through the network via which the media session could be established. The endpoints have access to type metrics associated with the available paths which convey the directness of the available paths, the type metrics for making a selection of an available path for the media session. The method comprises the following steps. Network information indicative of the quality of the available paths is accessed, the network information collected from a plurality of network nodes and comprising contributions from network nodes other than the initiating and receiving endpoints which have current and/or have had past visibility of at least parts of the available paths. Selection data is generated based on the network information, the selection data for influencing said selection. The selection data is transmitted to at least one of the endpoints so as to cause the endpoints to select for the media session a higher quality but less direct available path in favour of a more direct but lower quality available path.

BRIEF DESCRIPTION OF FIGURES

To aid understanding of the subject matter and to show how the same may be carried into effect, reference will now be made by way of example only to the following drawings in which:

FIG. 5 illustrates operation of a Network Address Translator.

DETAILED DESCRIPTION

Embodiments will now be described by way of example only.

Figure 1:
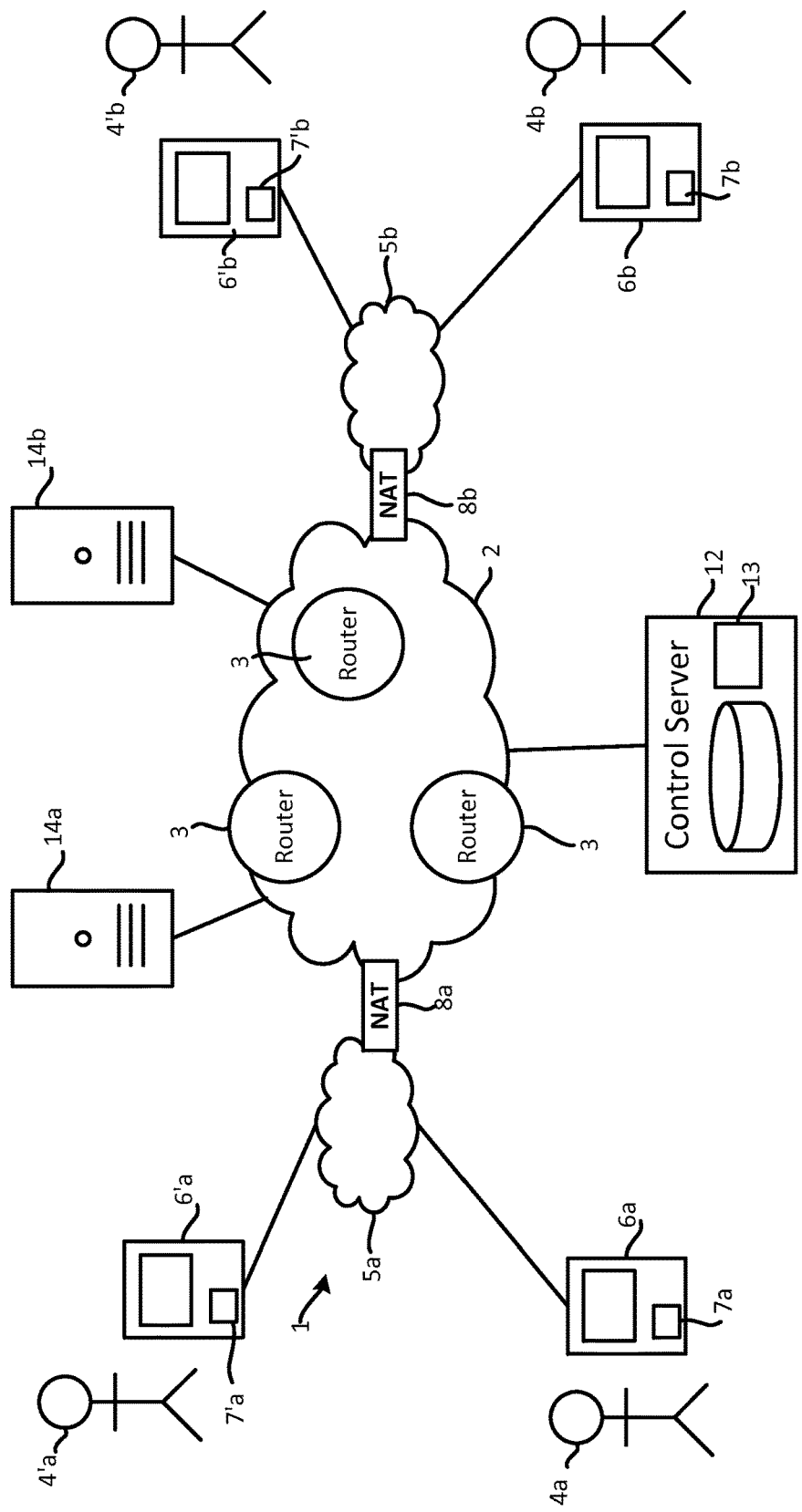
FIG. 1 shows a communication system.

FIG. 1 is a schematic illustration of a communication system, which comprises: a public network 2, which is a packet-based internet (that is, a system of interconnected individual networks) e.g. the Internet, having a public address space; first and second endpoints, which are first and second user devices 6a, 6b operated by first and second users 4a, 4b; third and fourth endpoints, which are third and fourth user devices 6'a, 6'b operated by third and fourth users 4'a, 4'b; first and second media servers 14a, 14b; and a control server (telemetry server) 12. The public network 2 comprises a plurality of routers 3 which route traffic between different individual networks (not shown) of the public network 2.

The user devices 6a, 6'a are connected to, and are network nodes of, a first packed-based private network 5a and the user devices 6'a, 6'b are connected to, and are network nodes of, a second packet-based private network 5b.

Each node of a private network has a respective private network address in a private address space of that private network which other nodes connected to that same private network (and only such nodes) can use to communicate with that node over that private network (and only over that private network). That address is private in that it cannot be used to communicate with that node by devices which are not connected to that same private network e.g. it cannot be used within the public network 2. Moreover, whilst that address is unique within that private network, other nodes may use the same network address within different networks (e.g. the first and second user devices 5a, 5b might happen to have the same private network address but which is useable to communicate with the first user device 6a only within the first private network 5a and which is useable to communicate with the second user device 6b only within the second private network 5b).

To enable nodes of the first private network 5a (resp. second private network 5b) to communicate with the public network 2, the first (resp. second) private network is connected to the public network 2 via a first Network Address Translator (NAT) 8a (resp. second NAT 5b). Each NAT 5a, 5b—as well as having respective private network addresses in the first and second private address spaces of the first and second private network 5a, 5b respectively (referred to as an address on the private side of that NAT)—also has a respective public network address in the public address space of the public network 2 (referred to as an address on the public side of that NAT). Thus, not only can nodes of the first and second private network 5a,5b communicate with the first and second NATs 5a, 5b respectively using those NATs' private network addresses, but nodes outside of that private network can communicate with those NATs 5a, 5b using those NATs' public network addresses.

A NAT (e.g. 8a, 8b) operates as an interface between a private network (e.g. 5a, 5b) and public network (e.g. 2) by mapping the private address space of the private network into the public address space of the public network, thereby enabling nodes of the private network to communicate outside of the private network over the public network.

Nodes outside of one of the private networks (5a/5b) can direct traffic intended for a particular node of that private network to the relevant NAT (8a/8b) via the public network 2 using that NATs public address, which that NAT then forwards the traffic to that node via that private network.

The operation of a NAT is described in detail below.

The private networks 5a, 5b and public network 2 and constitute a communication network 1, of which the various user devices 6a, ..., 6'b, NATs 8a, 8b, servers 12, 14a, 14b and routers 3 are network nodes. The communication network 1 is also an internet (which comprises the individual networks of the internet 2 as well as the private networks 5a, 5b).

The user devices 6a, 6b execute respective instances of communication client software 7a, 7b (client). The client enables the user devices 6a, 6b to establish media sessions between the user devices 6a, 6b over the network 1, for example to facilitate a real-time communication event (e.g. a voice and/or video call) between the user's 4a, 4b so that the users 4a, 4b can communicate with one another over the network 1, with call audio and/or video being transmitted and received between the devices 6a, 6b in the media session. The user devices 6'a, 6'b also execute respective instances of the client software 7'a, 7'b to similar effect.

Figure 2:
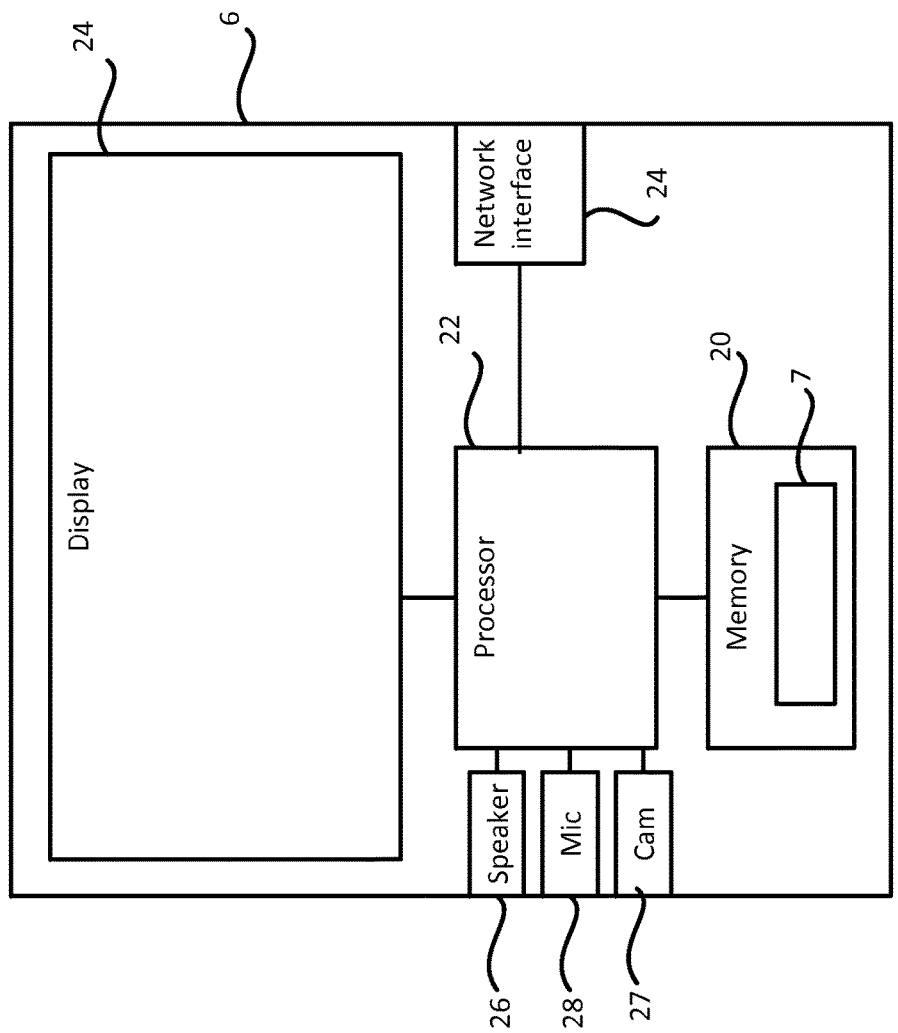
FIG. 2 shows a block diagram of a user device.

A user device may connect to the public network 2 by some other mechanism which does not involve any NATs though this is not shown in FIG. 2. For example, a user device may be connected via a Wi-Fi connection to a private network and to a public network via a mobile network with no NATs involved.

The control server 12 executes control code 13 for monitoring and controlling aspects of the communication between the various user devices in the manner described below.

FIG. 2 is a schematic block diagram of a user device 6 (e.g. 6a, 6b, 6'a, 6'b). The user device 6 is a computer device which can take a number of forms e.g. that of a desktop or laptop computer, mobile phone (e.g. smartphone), tablet computing device, wearable computing device, television (e.g. smart TV), set-top box, gaming console etc.

The user device 6 comprises a processor 22 to which is connected memory 20, one or more output devices, such as a display 24 and loudspeaker(s) 26, one or more input devices, such as a camera 27 and microphone 28, and a network interface 24, such as an Ethernet, Wi-Fi or mobile network (e.g. 3G, LTE etc.) interface which enables the user device 6 to connect to the network 1. The display 24 may comprise a touchscreen which can receive touch input from a user of the device 6, in which case the display 24 is also an input device of the user device 6. Any of the various components shown connected to the processor may be integrated in the user device 6, or non-integrated and connected to the processor 22 via a suitable external interface (wired e.g. Ethernet or wireless e.g. Wi-Fi).

The memory 20 holds a copy of the client 7 which, when executed on the processor 24, causes the user device 6 to implement the functionality of the client 7.

The client 7 has a user interface for receiving information from and outputting information to a user of the user device 6, including during a communication event such as a call. The user interface may comprise, for example, a Graphical User Interface (GUI) which outputs information via the display 24 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 3:
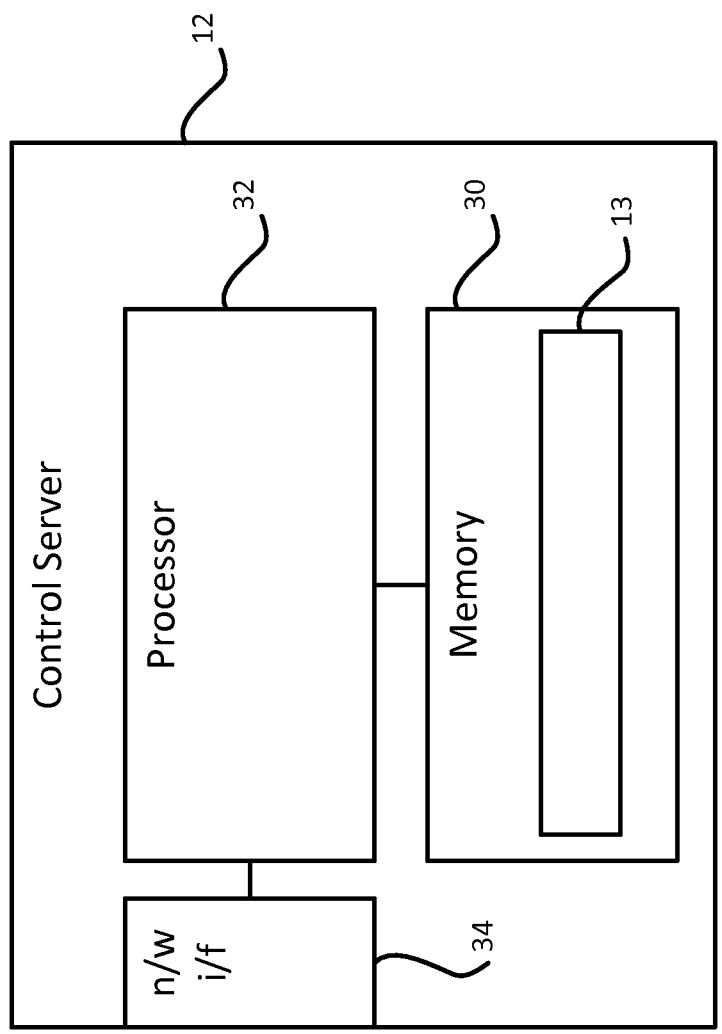
FIG. 3 shows a block diagram of a control server.

FIG. 3 is a schematic block diagram of the control server 12. The controller server 12 comprises a processor 32 to which is connected memory 30, and a network interface 34 which enables the control server 12 to connect to the network 1. The memory 30 holds the control software 13 which, when executed on the processor 32, causes the control server 12 to implement the functionality of the control software 13. Although depicted as a single device, the functionality of the control server 12 may be distributed across multiple server devices in a distributed fashion, or alternatively implemented by one or more user devices e.g. in a distributed, peer-to-peer fashion.

The network 1 has a layered architecture, whereby the functionality of the network 1 is organized into abstracted layers. This is illustrated schematically in FIG. 4. In this example, the network 1 implements the Internet protocol suite, whereby the functionality is organized into four layers 108-102: an application layer 108 (comparable to a combination of layers 5, 6 and 7 of the OSI ("Open Systems Interconnection") model), a transport layer 106 (comparable to layer 4 of the OSI model) below the application layer 108, a network layer 104 (comparable to layer 3 of the OSI model)—which is an internet layer—below the transport layer 106, and a link layer 102 (comparable to a combination of layers 1 and 2 of the OSI model) below the internet layer 104.

The application layer 108 provides process-to-process communication between processes running on different hosts i.e. general purpose computer devices connected to the network 1 such as user devices 6 and servers 12, 14 (note that routers 3 and NATs 8 are not "hosts" as the term is used herein). The transport layer 106 provides end-to-end communication between different hosts, including providing end-to-end channel(s) between hosts for use by the processes. The internet layer 104 provides routing i.e. communication between different individual networks of the internet 1, e.g. via routers 3/NATs 8 which operate at the internet layer, with the latter providing translation of network address information at the internet layer (network address translation). The link layer 102 provides communication between physical network addresses—for instance, MAC ("Medium Access Control") addresses—of adjacent nodes in same individual network the internet 1 e.g. via network switches and/or hubs etc. which operate at the link layer 102.

Application data (e.g. user data) to be transmitted over the network 1 is passed at a transmitting host from the application layer 108 to the transport layer 106, at which it is packetized into transport layer packet(s) in accordance with a transport layer protocol such as UDP ("User Datagram Protocol") or TCP ("Transmission Control Protocol"). TCP is a "reliable" stream delivery service in that it involves acknowledgment/retransmission mechanisms whereas UDP is an "unreliable" stream delivery service in that it does not involve any such mechanisms. Packets of unreliable services are called datagrams. The data of the transport layer packet(s) (e.g. TCP packet(s)/UDP datagram(s)) are then passed to the internet layer 104 at that host, at which the data is further packetized into IP datagram(s) in accordance with the Internet Protocol (which is an internet layer protocol). The data of the IP datagram(s) are then passed to the link layer 102 for transmission over the network 1 to a receiving host. When received at the receiving host, the data of the IP datagram(s) is passed up to the internet layer 104, at which the data of the transport layer packet(s) is extracted from the payload(s) of the IP datagram(s) and passed up to the transport layer 106, at which the application data is extracted from the payload(s) of the transport layer packet(s) and passed up to the application layer.

Figure 4:
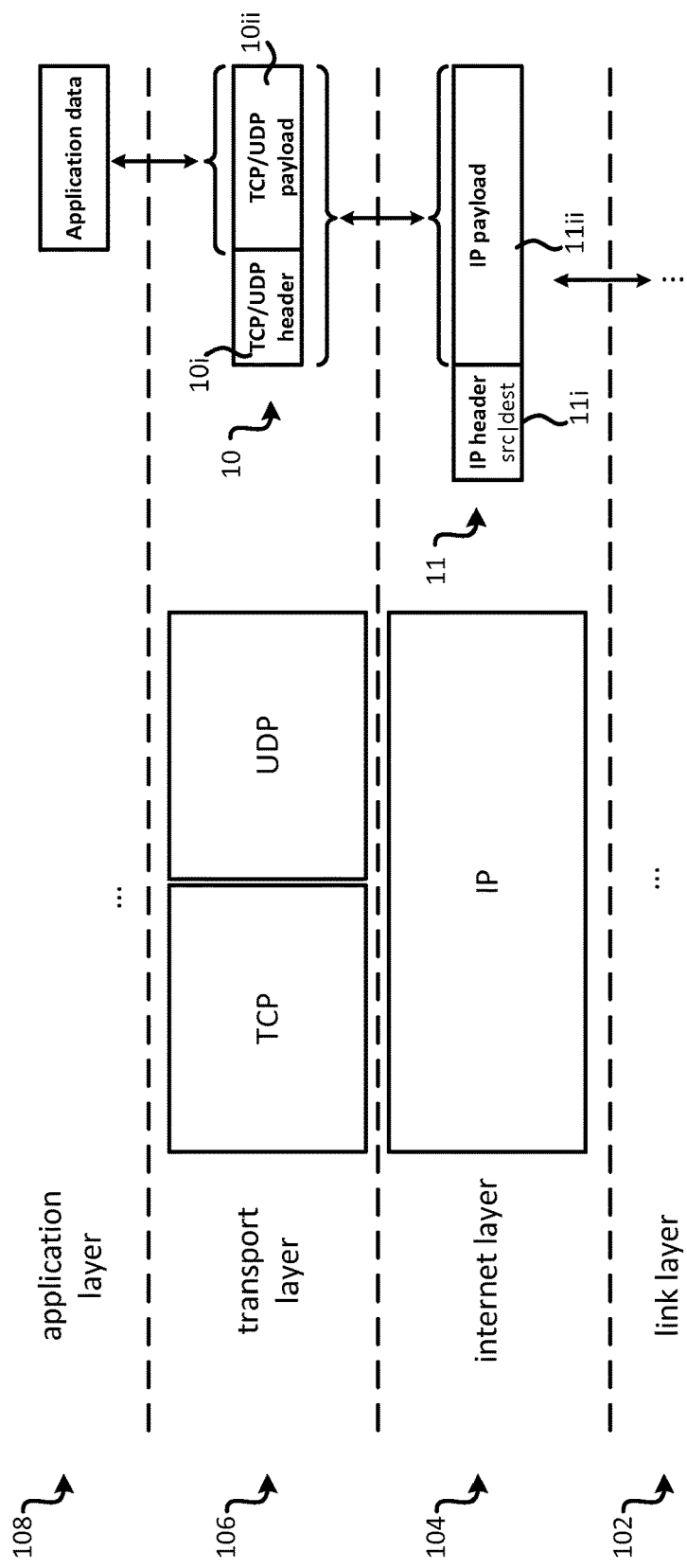
FIG. 4 shows a representation of a layered network architecture.

A transport layer packet (e.g. TCP packet or UDP datagram) 10 is illustrated in FIG. 4. The Transport layer packet 106 comprises a transport layer header (e.g. UDP/TCP header) 10*i*—which is generated and attached at the transport layer 106 of the transmitting host—and transport layer payload (e.g. UDP/TCP payload) 10*ii*—which encodes application data received from the Application layer 108.

An IP datagram 11 is also illustrated. The IP datagram 11 comprises an IP header 11*i*, which is generated and attached at the internet layer 104 of the transmitting host, and an IP payload 11*ii*, which encodes the data of the transport layer packet(s) received from the transport layer. The IP header comprises a destination transport address, which is a transport address to which the IP packet 11 is directed through the network 1, and a source transport address, which is a transport address local to the host (at least at this stage of packet generation) which generates the IP datagram.

The terms "IP header level" and "IP payload level" are used herein in reference to information encoded in IP header(s) and IP payload(s) respectively.

For packets generated within a private network (e.g. 5*a*/5*b*), the IP header includes a transport address which is a private network address in the private address space of that private network (e.g. private network address of user device 6*a*/6*b* in 5*a*/5*b*) and a port associated with that private address. As indicated, such a private address space is not useable outside of that private network. As such, were a simple router used to forward IP datagrams between that private network (e.g. 5*a*/5*b*) and a public network (e.g. 2), nodes outside of that private network would be unable to respond to such datagrams as they would not have any useable source address in the IP header.

To this end, a NAT may be used to provide an interface between a public and private network.

FIG. 5 illustrates the operation of a NAT 8 (e.g. 8*a*, 8*b*). An IP datagram 11, comprising an IP header 11*i* and IP payload 11*ii*, is received by the NAT via a private network 5 (e.g. 5*a*, 5*b*) from a node of that network such as a user device 6 (e.g. 6*a*/6'*a*, 6*b*/6'*b*). The IP header 11*i* contains an initial source transport address of the user device 6, which comprises a private network address (which is a private IP address) of the user device 6 in the private address space of the private network 5 and a port associated with that private address. The IP header 11*i* also contains a destination transport address to which the IP datagram 11 has been directed by the user device 6.

As shown, the NAT 8 modifies the IP header 11*i* to replace the initial source transport address with a new source transport address, thereby generating a modified IP datagram 11' with a modified header 11'*i* containing the new source transport address (the destination transport address and the IP payload 11*ii* are unmodified by the NAT 8). The new transport address comprises a public network address (which is a public IP address) of the NAT 8 in the public address space of the public network 2, and a port associated with that public IP address.

The NAT 8 maintains a mapping 9 between the initial transport address and the new transport address so that it can forward any return traffic that has been directed to the new transport address via the public network 2 (and which will thus end up at the NAT 8) to the initial transport address of the user device 6 via the private network 5.

In the simplest example, the NAT simply replaces the private IP address with its own public IP network address and does not alter the port. However, it is becoming increasingly common for NATs to implement address space masquerading, whereby the private address space is hidden behind a single network address. To prevent ambiguity in return packets, the NAT generally has to alter other information such as the port associated with the source address. For instance, a NAT may have a single public IP address and replace every transport address in the private address space with its own single public IP address and a unique (and likely different) port so that outside of the private network nodes of the private network are distinguished from one another only by ports associated with that single public IP address.

Typically NATs do not modify the IP payload(s), but only modify the IP header(s) in the above-described manner. This is generally acceptable for protocols (such as HTTP) which simply direct responses to the source address in the IP header.

However, others protocols including some media session protocols (such as SIP) also rely on address of endpoints encoded at the IP payload (not header) level. For example, the SIP protocol dictates that endpoints should use addresses which are contained in an SIP invite/SIP response to establish the media session, which will be encoded at the IP payload (not header) level. As illustrates in FIG. 5, this is not modified by the NAT 8.

Thus, for example, supposing the first user device 6*a* in FIG. 1 were to transmit a media session invite to the second user device 6b via the first NAT 8a encoded at the IP payload level. That NAT 8a would not modify the IP payload(s) thus, having received the invite, the second user device 6b would attempt to respond to the invite using the unmodified private transport of the first user device 6a from the unmodified IP payload(s) (not header)—this would fail as that private address is not useable outside of the private network 5a, and it would therefore not be possible to establish the session. Similarly, even if the first user device 6a were not behind the NAT 8a and instead had its own public IP address, the session establishment would still fail as the second user device 5b is behind the NAT 5b: in responding to the invite with a session invite response, the second user device 6b would include its own private address in the second address space of the second private network 5b in the response encoded at the IP payload level, which is similarly not useable by the first user device 6a.

To this end, protocols such as STUN ("Session Traversal Utilities for NAT") and TURN ("Traversal Using Relay NAT") have been developed to enable SIP sessions and the like to be established between endpoints which are separated by one or more NATs.

STUN allows an endpoint to determine whether or not it is located behind a NAT and, if so, the public address of the NAT which is mapped to the private address of the initiating endpoint (i.e. effectively giving it access to the mapping 9) so that the endpoint may include that public address in the IP payload(s) rather than its own private address. Typically, STUN works by the initiating endpoint sending a query to a STUN server, which is relayed to the STUN server through the NAT and via the public network as IP datagram(s). Because the NAT replaces the private address in the IP header(s) of the query with the corresponding public address on the public side of the NAT, the STUN server can obtain the latter from the IP header(s) of the query, which it can, in turn, provide to the initiating endpoint. The initiating endpoint can then established the session using that public address rather than its own private address, thereby conveying a useable address at the IP payload level to the responding endpoint in the session request. The responding endpoint can similarly discover its associated public address which it can convey to the initiating endpoint at the IP payload level in the response rather than its own private address. The role of the STUN server is effectively one of providing address discovery, and generally it does not participate in the media session once established.

As is known in the art, there are circumstances in which such a session cannot be established even when the public address of the NAT is known, for instance when the initiating and/or responding endpoint is behind a symmetric NAT. In such circumstances, one or more TURN relay servers can often be used to traverse the NAT by relaying media data through the TURN server(s).

When an endpoint needs to use a TURN relay, it sends a request to the TURN relay requesting that a unique public transport address on the TURN relay be allocated to the endpoint. If the request is accepted, the media session is then established using that public address of the TURN server as the source address for that endpoint. That endpoint sends to the TURN server media that it wishes to transmit in the session contained in TURN messages. The TURN server extracts the media from the TURN messages, and relays it onwards from the public address on the TURN server which has been allocated to that endpoint as a source address. The TURN server also relays data intended for that endpoint which has been directed to the address allocated on the TURN server to that endpoint contained in TURN messages for extraction by that endpoint.

If both endpoints are located behind NATs that do not permit STUN, then each will need its own respective transport address to be allocated on a TURN server, in which case the media session is established between those two allocated TURN server addresses and each endpoint relays/receives data in TURN messages, with data provided to the TURN servers being transmitted and received to/from the two TURN server addresses allocated to those endpoints in the media session.

TURN relaying requires resources—including the unique public transport address(es) allocated on the TURN server(s)—to be allocated on that (those) server(s) for at least the duration that media session, and also means that media of the media session travels via a less direct path than when a media session is established directly between the endpoints or via one or more NATs. Thus, whilst TURN relaying can more or less guarantee to provide a useable path through a network for a media session, this relaying comes at the cost of increased use of server resources and potentially increased latency due to the indirectness of the path.

STUN and TURN functionality can be incorporated in the same server, which is sometimes also referred simply to as a TURN server even though it also includes STUN functionality.

The media servers 14a and 14b of FIG. 1 are TURN servers, which incorporate both STUN and TURN functionality and thus have both address lookup and media relay functionality. Alternatively, this and/or other functionality may be split between separate servers, or the functions performed by the media servers 14a, 14b described below may be performed by the same server.

ICE ("Interactive Connectivity Establishment") is a known protocol that is used for establishing connectivity for VOIP sessions traversing network address NATs and firewalls, which attempts to establish the most efficient path in terms of media latency to ensure ideal media quality. Details of the ICE protocol can be found in the publically available RFC 5245, Interactive Connectivity Establishment (ICE): A Protocol for Network Address Translator (NAT) Traversal for Offer/Answer Protocols, J. Rosenberg (April 2010). Certain extensions to the ICE protocol are defined in [MS-ICE2] Interactive Connectivity Establishment (ICE) Extensions documentation (http://msdn.microsoft.com/en-us/library/office/cc431504(v=office.12).aspx).

In the context of ICE, a path with direct connectivity (direct path) between clients is preferred for a media session over an indirect path e.g. that involves using intermediate relay servers (e.g. relaying through TURN server(s)). A path in the context of ICE refers to a set of NAT(s) and/or media relay server(s) (if any: a path may include no NATs or servers) which can be used to transmit and receive data between those endpoints. As discussed below, a path is identified by a pair of transport addresses—one of which is used to transmit and receive data by an initiating endpoint and the other to transmit and receive data by a responding endpoint—which define such a set of NAT(s) and/or media relay server(s) (if any).

A "direct" path in the context of ICE means a path whereby data intended for a receiving endpoint transmitted along that path by a transmitting endpoint is not processed above the internet layer when in transit of that path i.e. so that that data is only processed at/above the transport layer of the transmitting endpoint before being passed to the internet layer for transmission and at/above the transport layer of the receiving endpoint having been passed up from the internet layer following receipt at the receiving endpoint. Paths which do not include any media relay servers (e.g. TURN servers) are direct, including those that do have NAT(s) and/or routers as these do not process such data above the internet layer (though they may nonetheless implement transport and application layers e.g. for administrative purposes).

An "indirect" path in the context of ICE means a path whereby data intended for a receiving endpoint transmitted along that path by a transmitting endpoint is processed above the internet layer (e.g. at the transport and possibly higher layer(s) e.g. application layer) when in transit of that path. That is, such that data is passed up to the transport layer for processing at or above that layer after being transmitted by the transmitting endpoint but before being received at the receiving endpoint at some intermediary network node somewhere along the path. Paths which include one or more media (e.g. TURN) relay servers are indirect.

ICE permits only paths through a network which are symmetric. A symmetric path in this context means a path whereby data transmitted from a first endpoint to a second endpoint along that path traverses the same set of NAT(s) and/or media relay server(s) (if any) as data transmitted along that path from the second endpoint to the first endpoint, but in reverse order. Of course, there may well be asymmetry in terms of the route taken between endpoints and NATs, endpoints and servers, NATs and NATs, servers and servers, servers and NATs etc. e.g. for internet traffic, data may travel through different individual networks of the internet in each direction and/or at different times, and thus through different routers, but nevertheless passes through the same NAT(s) and/or TURN server(s) (if any) in both directions. A direct path which includes no servers or NATs is symmetric.

Figure 6A:
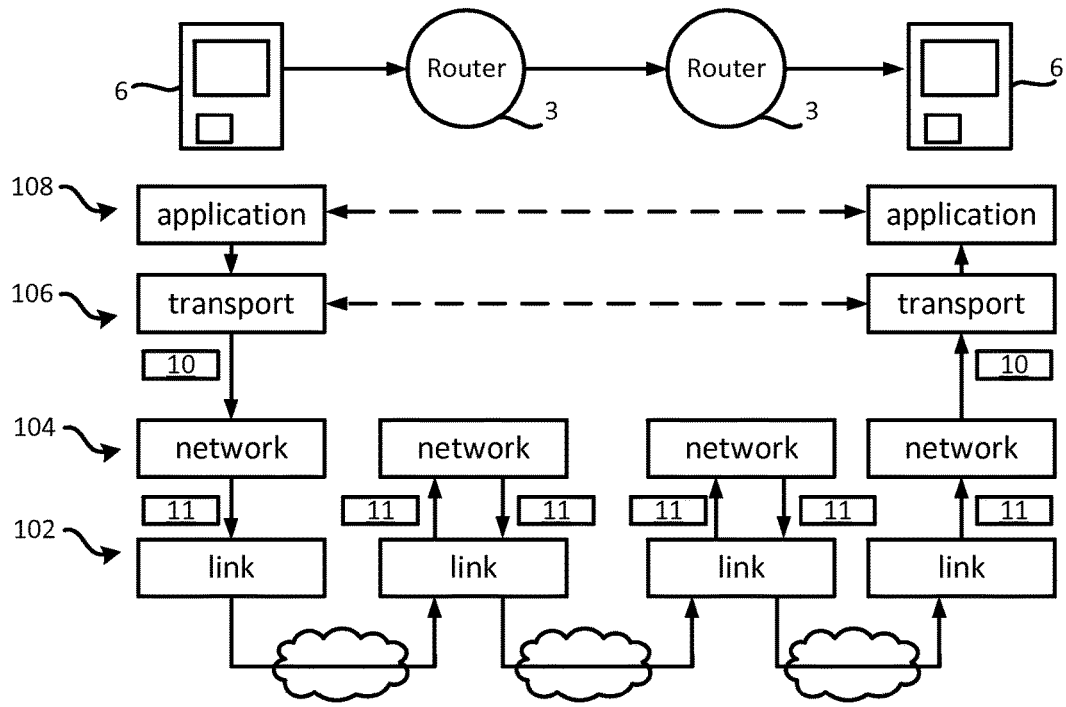
FIGS. 6A-C illustrate a first, second and third path through a network for a media session respectively.
Figure 6B:
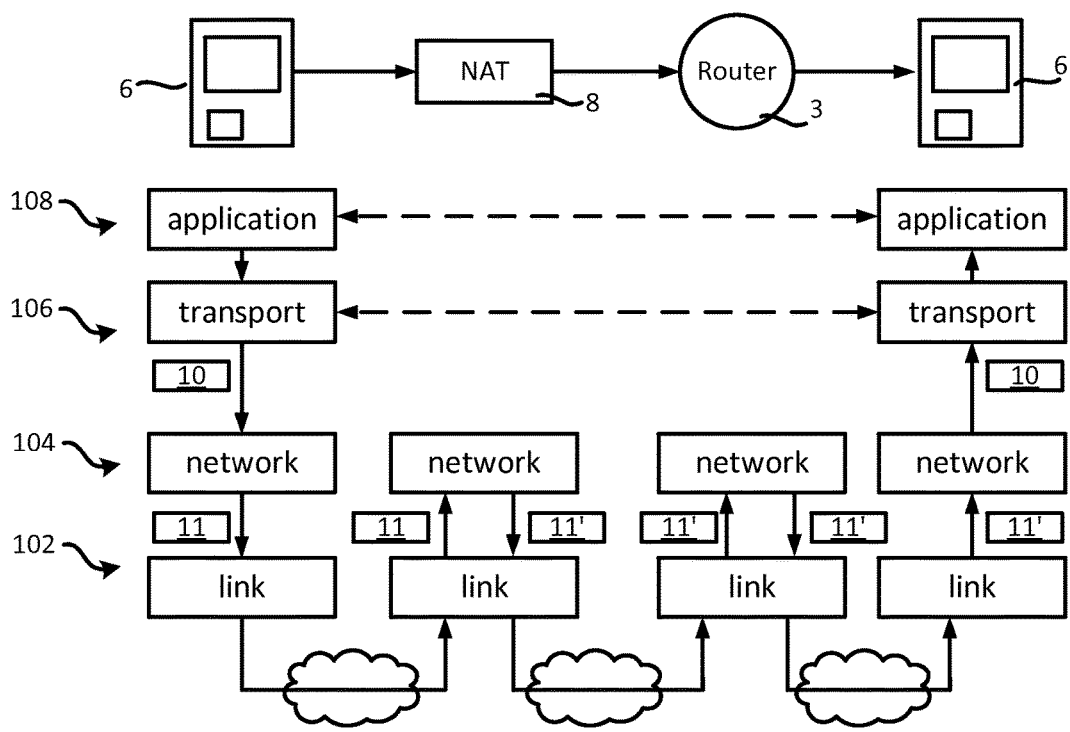

FIGS. 6A-6B show examples of paths through the network 1 of FIG. 1 which are symmetric and which are considered direct in the context of ICE.

FIG. 6A shows data intended for a receiving endpoint 6 (right hand side) travelling in one direction along a first path from a transmitting endpoint 6 (left hand side) to the receiving endpoint. The first path does not include any NATs 8 or relay servers 14. The path is symmetric in that data traveling in the other direction also does not go via any NATs 8 or relay servers 14, though it may go via different routers 3 in different directions and/or at different times.

As illustrated, once the data has been passed from the transport layer 106 as transport layer (e.g. UDP/TCP) packets 10 to the network layer 104 by the transmitting endpoint, it remains at or below the network layer 104 until reaching the receiving endpoint. That is, there is no transport layer (or higher) processing of the data whilst travelling along first path. IP packets 10 conveying the data may be fragmented along the way, but aside from that remain unmodified, and the transport layer packets 10 thus arrive at the transport layer of the receiving endpoint similarly unmodified.

FIG. 6B shows data intended for a receiving endpoint 6 (right hand side) travelling in one direction along a second path from a transmitting endpoint 6 (left hand side) to the receiving endpoint. The second path does include at least one NAT 8 but does not include any relay servers 14. The path is symmetric in that data traveling in the other direction goes via the same NAT(s) 8 (in reverse order) but no relay servers 14, though it may go via different routers 3, though the routers it traverses in either direction and/or at different times may be different.

Again, once the data has been passed from the transport layer 106 as transport layer (e.g. UDP/TCP) packets 10 to the network layer 104 at a transmitting endpoint, it remains at or below the network layer 104 until reaching a receiving endpoint. However, in contrast to the first path of FIG. 6A, IP packets 11 conveying the data are modified at the NAT 8 to change the source address in the IP headers. The modified IP packets are labelled 11' in FIG. 7B. Nevertheless, the IP payloads encoding the transport layer packets 10 are not modified and the transport layer packets 10 are therefore received at the transport layer of the receiving endpoint unmodified.

Figure 6C:
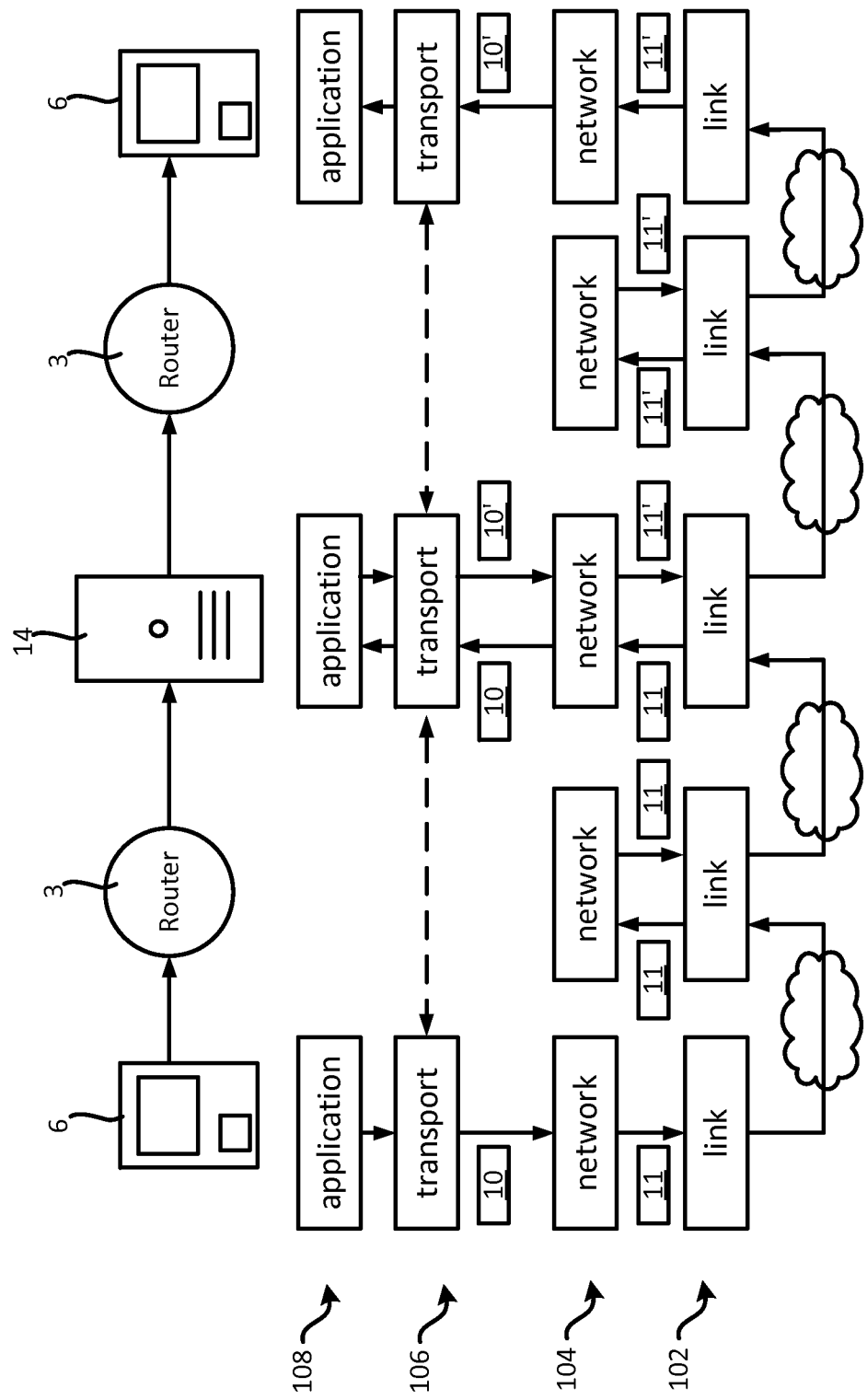

FIG. 6C shows an example of a symmetric indirect path through the network 1.

FIG. 6C shows data intended for a receiving endpoint 6 (right hand side) travelling in one direction along a third path from a transmitting endpoint 6 (left hand side) to the receiving endpoint. The third path does include at least one media relay server 14 and may also include one or more NAT(s) (not shown). The path is symmetric in that data traveling in the other direction goes via the same relay(s) and NAT(s) (in reverse order), but may go via different routers in different directions and/or at different times.

If the TURN server 14 shown in FIG. 6C is allocated to the transmitting endpoint 6 (left hand side), then the data is transmitted from the transmitting endpoint to the server 14 contained in TURN messages from which it is extracted and relayed on towards the receiving endpoint, otherwise if the TURN server is allocated to the receiving endpoint the data received from the transmitting endpoint at the relay server 14 is wrapped up into TURN messages for transmission toward the receiving endpoint. In either event, the TURN server operates at the transport and application layers to reformat the data when in transit of the third path which makes the third path indirect. Due to the reformatting, the receiving endpoint receives transport layer packets 10' which are different from those originally transmitted by the transmitting endpoint (10).

The ICE protocol attempts to identify what it deems to be the most efficient path based on static priorities, which are assigned to each of a number of so-called "candidate pairs" that could be used for the media session. A candidate is a transport address associated either an initiating endpoint or a responding endpoint. A candidate pair is a pair of candidates (i,r), the first (i) associated with the initiating endpoint and the second (r) with the responding endpoint. The term "candidate" relates to the fact that the ICE mechanism initially assumes that any transport address associated with an endpoint might be useable for a media session (though it may not actually be useable for reasons discussed above)—the ICE protocol then involves identifying candidate(s) which are actually useable.

ICE classes candidates into 3 categories: host candidates, reflexive candidates and relayed candidates.

A host candidate is a transport address which is local to the endpoint in question i.e. on a network interface directly attached to the endpoint. For example, the private addresses of the user devices 6a, 6b are local to those user devices and are thus host candidates, and similarly if the user devices were directly connected to the public network 2 (rather than or in addition to via the NATS 8a, 8b) they would have their own public addresses local to those user devices which would also be host addresses.

A reflexive candidate is a transport address which is not local to an endpoint, but which is a translated transport address on the public side of a NAT (e.g. as included in the modified IP header 11'i of FIG. 5). These are classed into two sub categories: "server reflexive candidates" which are public NAT addresses discovered by querying a server e.g.

STUN server in the manner outlined above, and "peer reflexive candidates" which are discovered by the other endpoint during the establishment of the media session (e.g. a public side NAT address associated with the initiating endpoint as discovered by the responding endpoint, or vice versa).

A relayed candidate is a transport addresses allocated from a media relay server e.g. TURN server in the manner outlined above.

Figure 7:
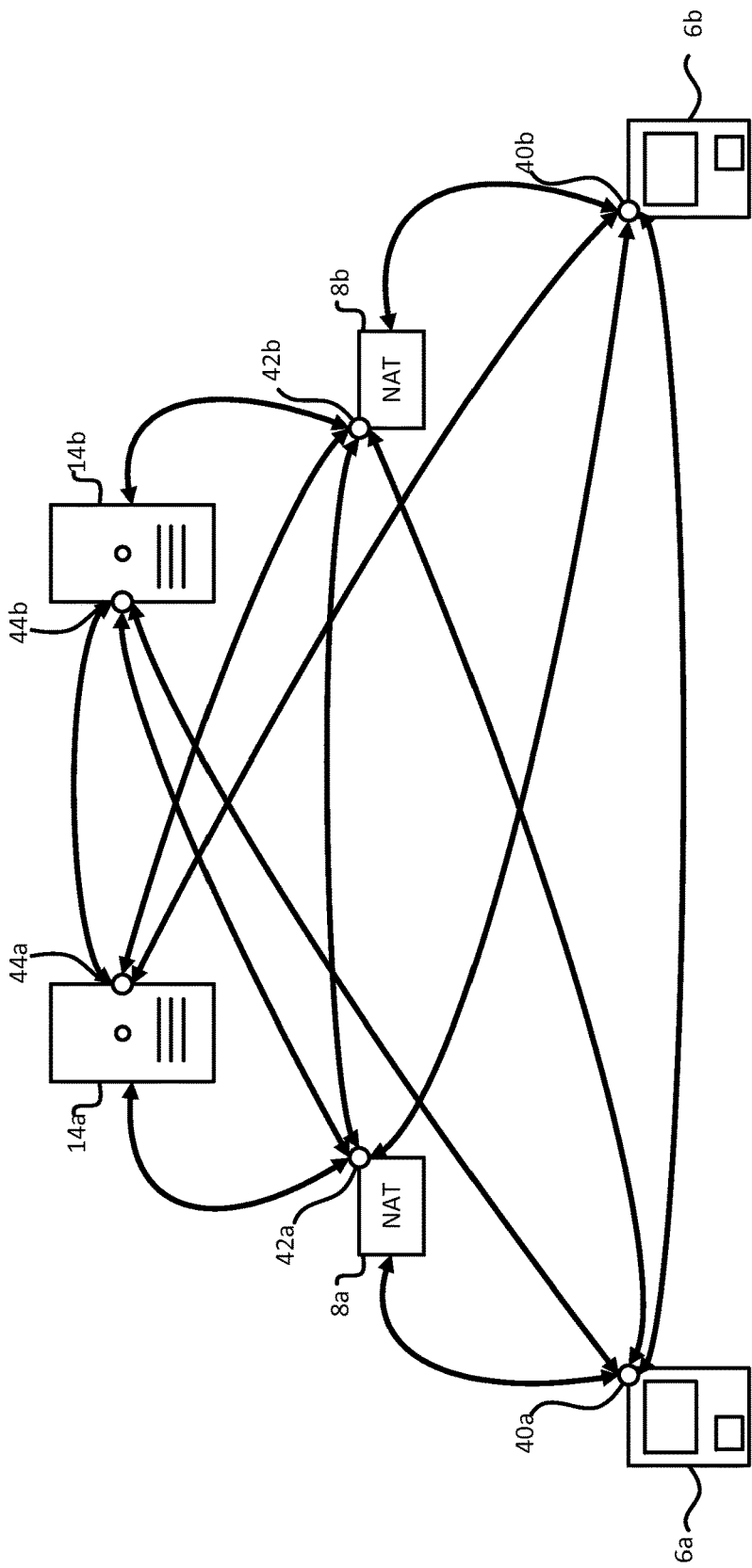
FIG. 7 illustrates a set of possible address pairings for a media session.

This is illustrated schematically in FIG. 7 for the first and second user devices 6a, 6b of FIG. 1. In this example, the first user device 6a is an initiating endpoint and the second user device 6b is a responding endpoint.

The first user device 6a is associated with a first local transport address (which is a host candidate) 40a; a first reflexive transport address (which is a reflexive candidate) 42a on the public side of the first NAT 8a and mapped to a private transport address of the first user device 6a in the first private network 5a; and a first relay transport address 44a (which is a relayed candidate) allocated to the first user device 6a on the first TURN server 14a. Similarly, the first user device 6b is associated with a second local transport address (which is a host candidate) 40b; a second reflexive transport address (which is a reflexive candidate) 42b on the public side of the second NAT 8b mapped to a private transport address of the second user device 6b in the second private network 5b; and a second relay transport address 44b (which is a relayed candidate) allocated to the second user device 6b on the second TURN server 14b.

Potentially, any of the initiating endpoint's candidate transport addresses can be used to communicate with any of the responding endpoint's candidate transport addresses. That is, the first user device 6a can potentially direct data from any of its own associated addresses (40a, 42a, 44a) to any of the addresses associated with the second user device (40b, 42b, 44b) and vice versa. In the example of FIG. 6, this results in nine candidate pairs that could potentially be used for communication between the first and second user devices 6a, 6b: [(40a, 40b), (40a, 42b), . . . , (44a, 42b), (44a, 44b)].

However, in practice, some candidate pairs will not be valid (i.e. will not work). For instance, if the endpoints are both behind NATs and their host candidates 40a, 40b are private addresses in the private networks 5a/5b, they are unlikely to be able to communicate directly using those addresses 40a, 40b for the reasons discussed above. However, if their host candidates 40a, 40b are public addresses which, when used, do not involve routing data through any NATs then the candidate pair (40a, 40b) may well be valid.

Similarly depending on the type of NATs (e.g. if it is a symmetric NAT), use of reflexive candidates 42a and/or 42b may not be possible as discussed.

Each candidate pair thus potentially represents a path through the network of a certain type, although such a path will only be available in practice if the candidate pair is actually valid.

A pair of host candidates (e.g. (40a, 40b)) potentially represents a direct path through a network, which is a first direct path of the type described above with reference to FIG. 6A that does not involve any NATs or media relay servers. However, such a candidate pair will be invalid if either of the local addresses 40a, 40b is a private address, usage of which in fact involves sending data via a NAT.

A pair of candidates, at least one of which is a reflexive candidate, (e.g. (40a, 42b), (42a, 40b), (42a, 42b)) potentially represents a direct path through the network, which is a second direct path of the type described above with reference to FIG. 6B that does involve NAT(s) but no media relay servers. However, such a candidate pair will be invalid if (either of) the reflexive address(es) is on the public side of e.g. a symmetric NAT.

A pair of candidates, at least one of which is a relayed candidate, (e.g. (40a, 44b), (42a, 44b), (44a, 44b), (44a, 42b), (44a, 40b)) represents an indirect path through the network of the type described above with reference to FIG. 6C which is likely to work but at the expense of requiring resource allocation on a media relay server(s).

As part of an ICE media session establishment procedure, both the initiating endpoint and the responding endpoint attempt to discover all their candidates by communicating with an appropriate TURN server (e.g. 14a, 14b), which are then paired in all possible combinations—e.g. if the six candidates 40a, 44b were discovered, this would result in the nine candidate pairs discussed above. ICE then attempts to discover which candidate pairs are valid. The way that ICE does this is to systematically try all possible pairs in a specific sorted order until it finds a set of one or more valid (i.e. working) candidate pairs, one of which can then be selected for the media session. Whenever at least one of the endpoints discovers more than one candidate giving rise to multiple candidate pairs, there will be a plurality of potentially available paths through the network via which the media session could be established (though not all of them may actually be available as not every candidate pair is valid).

The order in which candidate pairs are tried is dictated by the ICE static priority scheme, with higher priority pairs being tried ahead of lower priority pairs.

In accordance with the ICE protocol, each candidate (e.g. 40a-44b) can be assigned a static priority in accordance with equation 1:

$$\text{priority}=(2^{24})*(\text{type preference})+(2^{8})*(\text{local preference})+(2^{0})*(256-\text{component ID})$$

The type preference (one example of a type metric) is an integer from 0 to 126 inclusive, and represents the preference for the type of the candidate (local, server reflexive, peer reflexive, and relayed). 126 is the highest preference, and a 0 is the lowest. Setting the value to a 0 means that candidates of this type will only be used as a last resort. The type preference is identical for all candidates of the same type and is different for candidates of different types. The type preference for peer reflexive candidates is higher than that of server reflexive candidates. The ICE protocol recommends values of 126 for host candidates (unless these are from a Virtual Private Network interface, in which case 0 is recommended), 100 for server reflexive candidates, 110 for peer reflexive candidates, and 0 for relayed candidates. The local preference is an integer from 0 to 65535 inclusive and represents a preference for the particular IP address from which the candidate was obtained when an endpoint is multihomed (connected to more than one computer network). When there is only a single IP address, ICE recommends setting this to the maximum of 65535, effectively making this term redundant when there is no multihoming. The component ID term is an identifier of the candidate.

As can be seen, by far the most significant term in equation 1 is the first term which is based on the candidate type.

Thus the ICE priority scheme deprioritizes indirect paths via relayed candidates, which it uses only as a last resort, and moreover biases the static priorities away from reflexive candidates.

Once the candidate pairs are formed and priorities assigned in accordance with equation (1), candidate pair static priorities for each candidate pair can be calculated in accordance with equation 2:

$$\text{pair priority} = 2^{32} * \text{MIN}(G,D) + 2 * \text{MAX}(G,D) + (G>D?1:0)$$

where G is the static priority for the initiating endpoint's candidate, D that for the responding endpoint's candidate, and G>D?1:0 an expression whose value is 1 if G is greater than D, and 0 otherwise.

Because ICE deprioritizes relayed candidates as compared with to non-relayed candidates, candidate pairs which include a relayed candidate are deprioritized as compared with those that do not. Thus, the ICE static priority scheme prioritizes more direct paths over less direct paths.

In addition, because ICE deprioritizes reflexive candidates as compared with host candidates, candidate pairs which include a reflexive candidate are deprioritized as compared with those that only comprise host candidates. Thus, the ICE static priority scheme is biased towards routes that do not involve NATs.

The static ICE path prioritization schemes is sufficient for controlled corporate deployments/topologies. However large scale global online service deployments of real time media services brings along a completely different set of challenges for which the static priority scheme may not only be insufficient but also be detrimental to media quality in certain cases. Finding the ideal connectivity path becomes critical to ensure the best possible experience for users and also to ensure media quality SLAs ("Service Level Agreements") for users subscribing to online services can be met.

Below are a few scenarios where just selecting the most efficient path based on static path priorities defined by ICE may not be sufficient or desirable.

1. As part of the online service contracts, companies might have MPLS ("MultiProtocol Label Switching") links that offer better media quality with lower latency. Even if the ICE static priority scheme determines the paths through MPLS links to be lower priority, using the MPLS links will in reality provide better media experience.

As is known in the art, MPLS is a mechanism that directs data from one network node to the next based on short path labels rather than long network addresses, which avoids needing to perform lookups in a routing table (which requires time and resources). The labels identify virtual paths ("MPLS links") between distant nodes, rather than the endpoints themselves. In a network implementing the MPLS mechanism, routing decisions for a packet are made solely on the basis of the labels attached to that packet without examining the packet itself, which is referred to as label switching. This is in contrast to packet switching e.g. used in IP routing, in which a router decides the next hop using the destination address of an IP packet from the IP header itself. ICE is blind to this lower-layer label switching, and simply treats these paths and paths involving less efficient routing mechanisms as equally "direct" provided they do not involve higher-layer intermediaries such as relay servers. The MPLS protocol can be considered as operating between OSI layer 2 (data link) and layer 3 (network) as they are traditionally defined, and is sometimes referred to as a "layer 2.5" protocol.

2. Regional ISP ("Internet Service Provider") Peering agreements can result in paths that would be favoured by ICE having extremely high latencies.

The term "peering" refers to data routing between two autonomous networks of an internet. Peering agreements dictate the manner different network operators, such as ISPs, can make use of each other's' networks and thus dictate the manner in which data is routed through such an internet.

Such lower-layer (e.g. internet layer) routing decisions are, again, invisible to ICE and, in the context of ICE and the present disclosure the resulting paths are "direct" because they do not involve higher-layer (e.g. transport/application layer) intermediaries such as media relay servers. However, in reality, such agreements can result in paths through the internet that are, say, geographically roundabout or otherwise inefficient (e.g. which involve unsuitable network(s) of the internet) and therefore prone to latency (and thus of low quality) but which ICE prioritizes highly because such paths are nonetheless "direct" (as the term is used herein).

In particular, the inventors have appreciated that routing decisions between different ISPs are typically not optimized. Sometimes routing decisions are made for commercial, rather than technical reasons i.e. a particular set of lower layer routing decisions are made not because they will provide e.g. the fastest route involving the fewest hops between individual networks or because they are optimal from a technical perspective in some other sense, but rather because they are cheaper for the ISP.

These sub-optimal routing decisions are essentially invisible at higher layers (although their effect in terms of sub-optimal media delivery is manifest), nor are they directly controllable outside of the ISP's own domain. However, the inventors have appreciated that, through the use of controlled higher layer relaying, lower layer behaviour can nonetheless be influenced to the advantage of the end-users e.g. to avoid network paths known to employ unfavourable routing decisions as revealed through the consideration of network quality metrics from past media session over time.

3. The quality of media paths can vary depending on time and load on the network and may not directly correlate to ICE static priorities.

4. ICE lacks the ability to learn and adapt connectivity paths based on telemetry gathered from previously established media sessions.

Instead of relying solely on static priorities provided by ICE, the disclosure provides a mechanism whereby path selection can be additionally influenced by relevant network information. The network information is indicative of the quality of the paths that are available (or at least potentially available) for a media session between the initiating and the responding endpoint. The "quality" of a path in this context refers to the end-user experience which that path is able to deliver when used for the media session. Paths which degrade the end-user experience, for instance because they are susceptible to packet loss, excessive latency, excessive jitter etc. and so degrade the perceptual quality (i.e. from a user's perspective) of media (e.g. audio and/or video) as received along that path, are of lower quality, whereas paths which enhance the end-user experience, for instance because they exhibit minimal packet loss, low latency, low jitter etc. and so do not significantly degrade the perceptual quality of the media, are of higher quality.

This network information can either be configured by administrators or determined dynamically during media session establishment or alternatively based on telemetry gathered from a previously established media session(s). The decisions could be based on data gathered by just the client(s) making the selection, or the client(s) can work in a conjunction with a server that has a richer set of data on connectivity paths and network quality characteristics.

Among other things, the present disclosure extends the ICE protocol to:

a. include topology/deployment information to establish the best connectivity path for real time media (MPLS, ISP Peering etc.). "Topology information" in this context means information that pertains to the routing of data between individual networks of an internet at the network layer or below (e.g. MPLS routing is, in a sense, performed below the network layer—see above). This information could either be configured on the clients or the clients could discover this information from a telemetry server that provides topology and call quality telemetry information relevant to the entities involved in the media session (caller/callee endpoint and relay servers). Both MPLS and ISP peering agreements result in routing decisions that do not affect the "directness" of the path as the term is used herein because they do not introduce any higher-layer intermediaries (e.g. media relay servers), and which are thus invisible to the ICE protocol, but which are nonetheless highly relevant in terms of path quality (with paths involving MPLS routing tending to be of higher quality and paths involving routing dictated by ISP peering agreements potentially of lower quality, depending on the nature of the agreements);
b. include dynamic discovery of path quality during connectivity establishment of media session or ongoing monitoring during the media session;
c. leverage telemetry gathered from previously established media sessions to establish a better media connectivity path for subsequent calls;
d. enable prioritization of paths of better quality and to deprioritize or complete remove paths of lower quality;
e. enable switching of media paths during a media session if the quality of current media path degrades to be worse than another available media path (typically several viable media paths exist between the caller and callee endpoints).

With ICE the caller endpoint is typically nominated as the controlling endpoint and is responsible for selecting the final path to be used for media flow. In accordance with the following, the controlling endpoint also incorporates the aforementioned topology information while selecting the final path for media flow.

Figure 8:
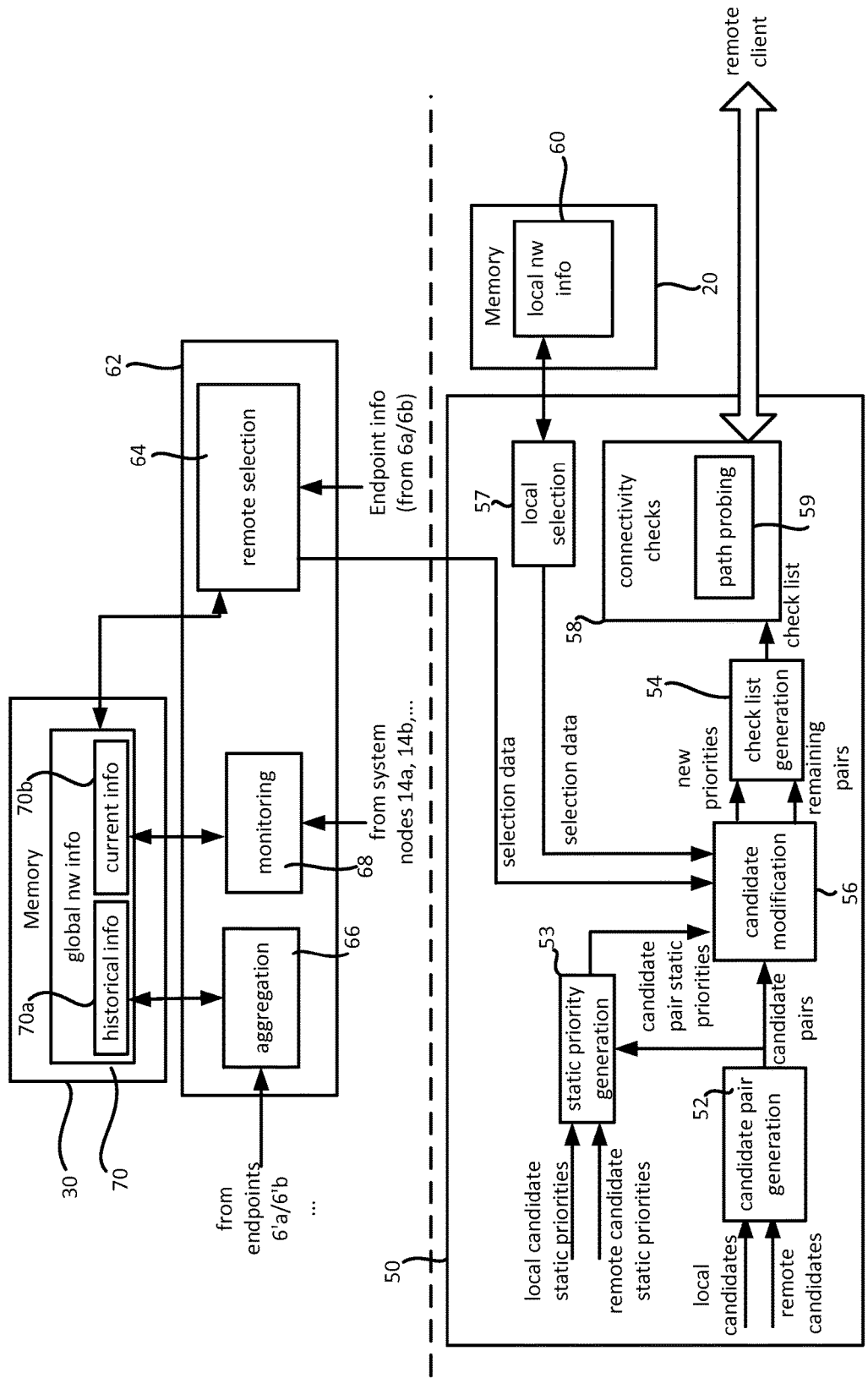
FIG. 8 shows a function block diagram representing functionally of an endpoint(s) and a control server.

FIG. 8 is a function block diagram, in which functional blocks (components) below the dashed line in FIG. 8 represent functionality implemented by a client 7 (7a and/or 7b) when executed on a user device 6 (6a and/or 6b). Components above the dotted line represent functionality implemented by the control code 13 when executed on the control server 12.

The client 7a implements a path selection system 50 which comprises a candidate pair generation component 52, a static priority generation component 53, a check list generation component 54, and a candidate modification component 56, a local selection component 57, and a connectivity check component 58 which includes a path probing component 59. The components 52, 53 and 56 constitute a priority generation component.

The control code 13 implements control system 62, which comprises a remote selection component 64, an aggregation component 66 and a monitoring component 68.

The modification, check list generation and connectivity check components 56, 54, 58 constitute a path selection component for selecting a path for a media session.

Figure 9:
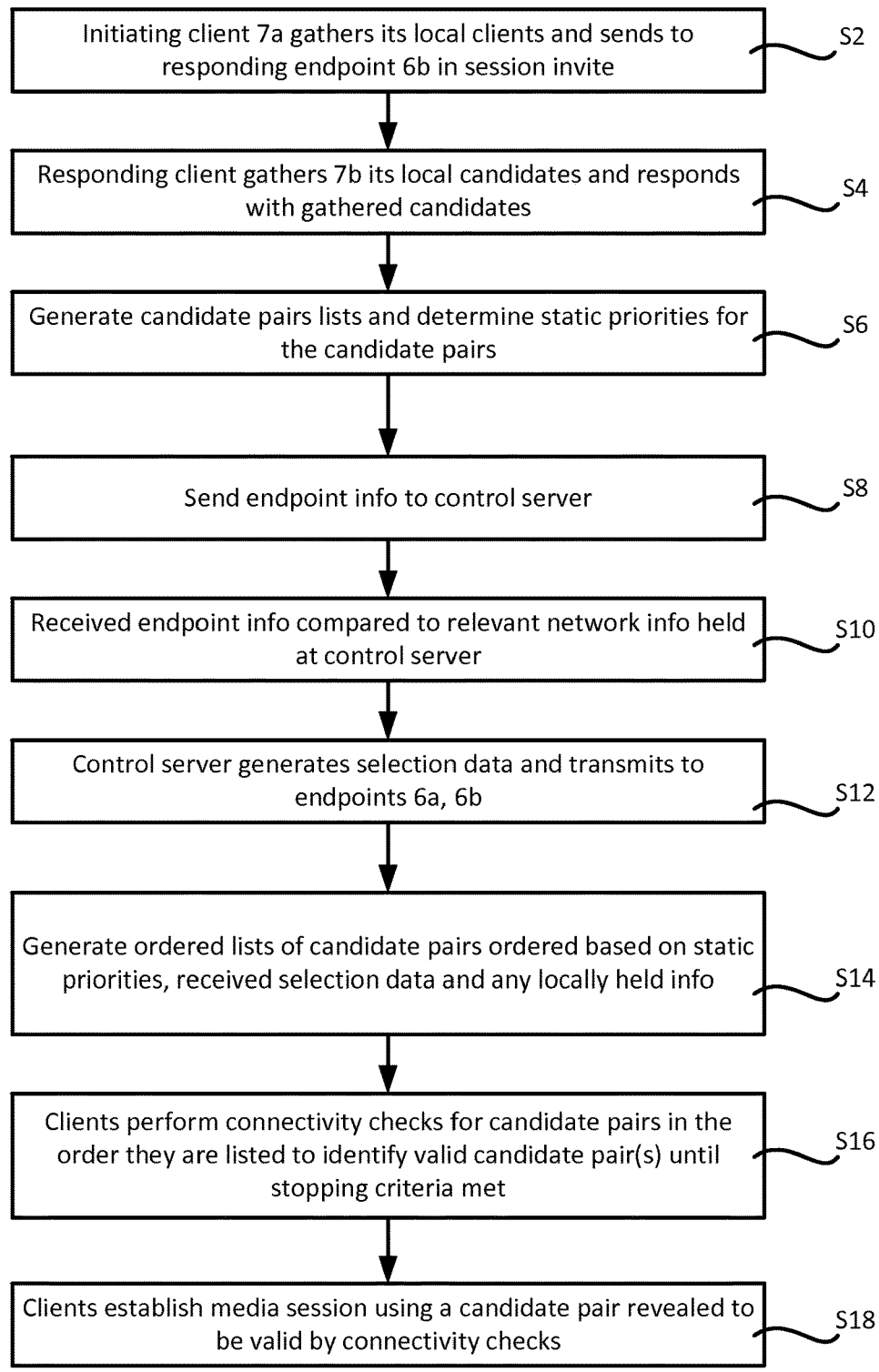
FIG. 9 is a flow chart for a method for effecting a media session.

A method for effecting a media session between an initiating endpoint 6a and a responding endpoint 6b will now be described with reference to FIG. 9, which is a flow chart for the method. Both endpoints 6a, 6b implement the ICE protocol as defined in MS-ICE2, with the addition of extra functionality described herein.

At S2 the client on the initiating endpoint 7a (initiating client) communicates with the first TURN server 14a to discover its candidates (local candidates) i.e. any host, server reflexive and relayed candidates which it might be able to use for the media session. The initiating client then transmits these to the responding endpoint 6b in a session invite message. In response (S4), the client 7b on the responding endpoint 6b (responding client) gathers it candidates (remote candidates) by communicating with the second TURN server 14b which it returns to the initiating endpoint.

At S6, the candidate pair generation component 52 receives both the local candidates and the remote candidates as discover by the initiating and responding endpoint respectively, from which it generates and outputs a set of candidate pairs. The candidate pair generation component 53 receives the generated set of candidate pairs as well as ICE static priorities assigned to the local and remote candidates, and generates based on the three inputs static priorities for the candidate pairs. Both endpoints may perform the same candidate pair/priority adjustment processes in parallel, or one endpoint may perform these and communicate the results to the other.

Each of the candidate pairs potentially corresponds to an available path through the network which might be used by the endpoints for the media session if that candidate pair turns out to be valid.

S2-S6 are in accordance with the normal ICE procedures outlined above.

At S8, one or both of the endpoints 6a, 6b sends endpoint information pertaining to at least one of the endpoints to the control server 12 for comparison with information held at the control server 12. The endpoint information comprises path information which identifies or otherwise convey information about the potentially available paths e.g. information about ISP(s) that data would be routed through if it were transmitted along that path, information that identifies or otherwise conveys information about any private network(s) 5a/5b through which data would be routed along that path, information identifying or otherwise pertaining to any media relay server(s) 14a/14b included along that path etc.

At S10, the endpoint information is received by the selection component 64 which compares the received information to global network information 70 held in memory 30 at the telemetry server 12. The selection component 64 then uses the results of this comparison to influence the manner in which the endpoint(s) 6a, 6b select a path through the network for the media session to ensure that they select a path of suitably high quality even if that path is not favoured by the ICE static priority scheme and has been assigned a low static priority (see below).

The global network information comprises network topology/deployment information and call quality telemetry information collected from various entities (nodes) in the network 2, some of which is likely relevant to the entities involved in the media session (i.e. caller/callee endpoint 6a, 6b and relay servers).

The global network information 70 comprises current and historical network information 70, 70b which are contributions from the aggregation and monitoring components 66, 68 respectively. The contributions 70a, 70b are updated over time so as to provide a rich source of information about the network 2, including information about the quality of the paths that are potentially available to the initiating and responding endpoints 6a, 6b, that the selection component 64 can use to influence the path selection.

The aggregation component receives and aggregates information from network nodes, such as other endpoints e.g. 6'a, 6'b over time to provide the historical network information 70a. The historical information 70a comprises telemetry information relating to previously established media sessions. Endpoints (e.g. 6'a, 6'b) gather telemetry information during established media sessions, for example by performing measurements of round trip time (RTT), jitter, packet loss etc. This gathered telemetry can then be leveraged to select a better media path for subsequent media sessions, including the session that the endpoints 6a, 6b are currently attempting to establish.

The selection component 64 can then compare the endpoint information received from the endpoints 6a, 6b and, if the telemetry information indicates, say, that historically other endpoints have previously experienced poor quality along one of the paths potentially available to the endpoints 6a, 6b, or along some other path that overlaps (i.e. coincides at least in part with) that path e.g. because those paths, say, have at least one media server, private network/NAT, and/or ISP etc. in common (but might otherwise be different), the selection component can then influence the selection to bias it away from that potentially available path i.e. to make it less likely that the endpoints 6a, 6b will select that path for their media session. The paths do not have to overlap entirely, and the selection component can perform a statistical analysis extrapolate information about a given path from historical information about multiple paths that overlap to some extent with that path.

For example, if a given path potentially available to the endpoints 6a, 6b includes a first and a second media relay server, and there is historical information available for a first path which includes the first relay but not the second and there is also historical information available for a second path which includes the second relay, the selection component 64 can extrapolate information about that given path from both sets of information. For instance, if both the first and second paths are historically of high quality, then it is reasonable to assume that the given path might also be of high quality, subject to other network information to the contrary. Alternatively, if, say, the second path was historically of low quality that might indicate that the given path is also of low quality though this assumption is something of a leap. However, if historical information revealed that numerous paths—all of which include the second relay but are otherwise different—are all historically of low quality, it can be deduced with a reasonably high level of statistical certainty that the second relay is problematic and that the given path is likely to be of low quality due to the presence of the second relay.

The monitoring component 68 receives network information from network nodes that have current visibility of parts of the network 2, such as media relay servers 14 that have current visibility of their own operation. For example, media relay servers 14 can convey to the monitoring component 68 whether or not they are currently performing correctly, how well they are performing e.g. as conveyed in terms of a performance metric that indicates, say, the speed at which they are currently able to convey packets or the likelihood of them losing a packet, what resources they currently have available etc. Based on this received information, the monitoring component 68 updates the current network information 70b to reflect the current state of the network 2, which can change the manner in which the selection component 64 operates. For example, when one of the first and second media relay servers is running out of resources (hence liable to introduce excessive packet delay, loss etc.) and the current network information 70b is updated to reflect this, and the selection component can then influence the path selection to prevent a path which uses that media relay form being selected as a result.

The global network information 70 thus comprises contributions from a wide variety of nodes in the network 2, including user devices 6, media relays 14 etc. which have current visibility of parts of the network 2 and/or which have had visibility of parts of the network 2, including parts which form part of the paths potentially available to the endpoints 6a, 6b.

The global network information 70 may also comprise administrator configured path information. This will typically be done for deployments with MPLS links or where information about ISP Peering or detailed topology information is known.

The administrator path information may also comprise information about routing decisions that are made within the internet 2 (which are invisible to ICE as it currently stands), which can be used to bias path selection away from (resp. towards) paths that are known to involve inefficient or otherwise undesirable (resp. efficient or otherwise desirable) routing decisions that would be detrimental (resp. beneficial) to path quality. Herein biasing a selection towards (resp. away) from a path means influencing a selection to increase (resp. decrease) the probability that that path is selected.

For instance, the administrator path information may comprise information about MPLS links, which can be used to bias path selection towards paths that include MPLS links (as these are likely to be of high quality), and/or information about ISP peering agreements, which can be used to bias the selection away from paths for which unfavourable peering agreements are known to be in place.

At S12, the selection component 64 generates first selection data for influencing the path selection, which it transmits to at least one of the endpoints 6a, 6b.

At S14, the check list generation component generates a "check list". The check list is an ordered list of candidate pairs which determines the order in which connectivity checks are performed (see below).

In accordance with the normal ICE procedures, the ordering of the checklist is based only on the candidate pair static priorities so that the candidate pairs are ordered in the order of their static priorities.

In contrast, here, the modification component 56 controls the ordering of the check list based on the selection data received from the selection component 64 and also based on local network information 20 held at the user device making the selection. The local selection component 57 generates second selection data based on the local network information which it supplies to the modification component 56 for influencing the selection in a similar manner to the first selection data. This local network information comprises local telemetry information gathered on the client for previous media sessions in which that client has participated. The local telemetry information is gathered in a similar manner to that held at the server 12 (see above), but reflects the client's own historical experiences and is gathered by the client monitoring path quality (e.g. RTT, jitter, packet loss etc.) during previously established media sessions in which it has itself participated. The local network information 60 may also comprise administrator and/or user configured path information similar to that held at the server 12, and the above description of the remote administrator configured information applies equally to its local counterpart. Again, this will typically be done for deployments with MPLS links or where information about ISP Peering or detailed topology information is known.

An input of the modification component 56 receives the set of candidate pairs from the candidate pair generation component 52 and, based on the selection data from the server 12 and the local network information, removes any candidate pairs indicated to be of unacceptably low quality by the selection data and/or local network information. In some cases, removed candidate pairs may have high or even the highest static priorities but are removed nonetheless because they are of unacceptably low quality.

An input of the modification component 56 also receives (and thus constitutes an access component having has access to) the candidate pair static priorities and, based on the selection data from the server 12 and the local network information, assigns new priorities for the remaining candidate pairs which may be different from their static priorities. For instance, the modification component 54 may assign a new priority to a candidate pair corresponding to a low (resp. high) quality path that is lower (resp. higher) that that path's static priority as assigned in accordance with the ICE protocol. For example, if gathered telemetry (local and/or at the server 12) showed a historical tendency towards poor media quality for a specific path, that path could be prioritized lower for subsequent media sessions.

In some embodiments, only one of candidate removal and generating new priorities may be performed.

The (remaining) pairs are supplied to the check list generation component 54 with their new priorities, and the check list is generated from these. The generated check list contains only the remaining candidate pairs and moreover is ordered based on the new priorities (not the static priorities). Hence, paths of unacceptably low quality are not present in the check list and, moreover, higher (resp. lower) quality paths may be shifted towards the top (resp. bottom) of the list even if they have lower (resp. higher) static priorities based on their higher (resp. lower) new priorities.

Note that the generation of selection data may involve a degree of manual oversight or direction. For example, a human operator may observe a drop in quality for certain types of paths e.g. through observation of network data e.g. the current status of nodes (e.g. relays) in the network and/or by manual observation of historical media session quality metrics, and manually configure the control system 62 to divert media sessions away from such paths which is then effected by the configured system 62 generating appropriate selection data (thus the dependence of the selection data generation on the network data may be at least in part introduced by way of a human intermediary). To this end, the control system 62 may have a user interface by which the system 62 can be manually configured.

At S16, the clients 7a, 7b perform connectivity checks. Connectivity checks are performed for individual candidate pairs in the check list in the order in which they appear in the check list, starting with the pair at the top of the list (i.e. in order of new priority). Thus, pairs with the highest new priorities (but not necessarily highest static priorities) are checked first. The connectivity checks continue until a stopping criterial is met e.g. until a certain number (one or more) of candidate pairs is revealed to be valid and/or after a predetermined amount of time has elapsed. For so-called "aggressive nomination", connectivity checks end when the first valid candidate is found; "regular nomination" however allows connectivity checks to continue to attempt to find more than one valid candidate pair (if desired). At the end of the connectivity checks, a list of the one or more candidates revealed to be valid is generated (valid list).

As indicated, some (possibly many) of the candidate pairs may fail the connectivity checks e.g. a candidate pair which includes a host candidate which is a private transport address is likely to fail for reasons discussed.

At S18, the media session is established using a candidate pair from the valid list (which may or may not be the only candidate pair found to be valid). Where only one valid candidate pair is found in the connectivity checks, that candidate is used to establish the media session; if there are multiple candidate pairs revealed, then one is selected and used to establish the media session. For example, the highest priority candidate pair in the valid set may be selected for the media session.

As will be apparent, removing candidates and/or performing connectivity checks based on the new (rather than static) priorities can result in path having a lower static priority but of higher quality being selected for the media session in favour of a path having a higher static priority but of lower quality.

During the connectivity checks of S16, the endpoints can find several potential paths for media flow. As part of connectivity checks in addition to establishing a media path the endpoints also probe the potential paths for media quality. The probing could be as simple as determine network RTT, packet loss, jitter etc. on the different paths for several seconds, or more complex quality measurements could be performed. The controlling endpoint can then select the best path for media quality based on the quality of the different paths as indicated by the probing instead of relying on static priorities defined by the ICE protocol.

If, during the established media session, the quality of the path currently being used for the media session changes—for example as detected by the monitoring component 66, or by the endpoints themselves e.g. by detecting that latency, jitter, and/or packet loss etc. has increased and/or by performing additional path probing whilst the media session is ongoing—then a different path can be selected from the previously generated valid list (if there is more than one), or a new valid list generated by restarting connectivity checks again, and the media session continued using that path instead.

It should be noted that, herein, an "available" path means a valid path which could actually be used for a media session (e.g. an invalid candidate pair does not represent an "available" path).

Whilst in the above, conventional ICE candidate pair priorities are calculated in accordance with equations 1 and 2, and then modified based on selection data to generate new priorities, alternatively the individual address priorities (computes as per equation 1) could be modified before computing the candidate pairs (as per equation 2, but applied to the modified address priorities), or similar priorities may be computed in other ways e.g. by effectively including modification terms in one or both of equations 1 or 2 which depend on the selection data.

Whilst the above has been described in the context of the ICE static priority scheme, the subject matter is not limited to this. In general, any priority scheme which favours a path along which data traverses only lower-layers of the network in transit of that path over another path along which data traverses higher-layers of the network in transit of that other path is considered a static priority scheme which prioritizes more direct paths over less direct paths. Moreover, whilst the above presents a type metric in the form of an ICE type preference, other type metrics not in accordance with the ICE protocol are also envisaged.

Note that references to "higher" and "lower" priorities do not necessarily refer to any particular numerical (or any other) representation of these priorities. Rather, a "higher priority" of a priority scheme means that assigned to a path which is favoured by that scheme as compared with another path assigned a "lower priority" irrespective of the manner in which those priorities are represented (any desired representation could be used provided it conveys the necessary information e.g. as a simple example, lower numerical values could be used to represent higher priorities).

The local and remote selection components 57, 64 described above constitute a selection component which generates selection data (that selection data comprising the first and second selection data). Whilst in the above the first selection data is generated by a selection component 64 at a remote server 12 (which holds the global network information 70 on which the selection data is based), in other embodiments the selection data may be generated locally i.e. the selection component 64 may be implemented by a user device instead. For instance, a user device may store (part of) the global network information 70 in local storage and access it in local storage, or it may access it remotely via the network if it is stored at the server 12, and the user device may generate the selection data from the locally/remotely accessed global network information 70 so that the selection data is received locally.

Note herein that a "private" network refers to any network that is behind a NAT. Whilst this includes networks such as home or business networks (not shown), it also includes pseudo-public networks operated by e.g. an Internet Service Provider (ISP) with a potentially large number of users (the latter being more common in some countries than in others).

Whilst the above is described with reference to the Internet protocol suite, the relevant teachings presented herein also apply to networks with different layered architectures. Further, whilst the above is described in relation to TCP/UDP and IP, it will be appreciated that the description applies to other types of transport layer and/or network layer protocols which can be used to generate different types of network layer and/or transport layer packets.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

A first aspect of the subject matter is directed to a method for effecting a media session between an initiating endpoint and a responding endpoint connected via a communication network which includes network nodes, there being a plurality of available paths through the network via which the media session could be established, wherein the endpoints have access to type metrics associated with the available paths which convey the directness of the available paths, the type metrics for making a selection of an available path for the media session, the method comprising: accessing network information indicative of the quality of the available paths, the network information collected from a plurality of network nodes and comprising contributions from network nodes other than the initiating and receiving endpoints which have current and/or have had past visibility of at least parts of the available paths; generating selection data based on the network information, the selection data for influencing said selection; and transmitting the selection data to at least one of the endpoints so as to cause the endpoints to select for the media session a higher quality but less direct available path in favour of a more direct but lower quality available path.

In embodiments, the network information may comprise telemetry gathered from previously established media sessions, the telemetry comprising contributions from endpoints other than the initiating and receiving endpoints. Part of the telemetry may have been gathered from a media session that was previously established via a path which overlaps one of the available paths, and the selection data generated based on the part of the telemetry. A first part of the telemetry may have been gathered from a first media session previously established via a first path which overlaps part of one of the available paths, and a second part of the telemetry may have been gathered from a second media session previously established via a second path which overlaps a different part of that available path, and the selection data may be generated based on both the first and second parts of the telemetry.

The network may be an internet in which data is routed between individual networks of the internet, and the network information may comprise topology information which conveys, for at least one of the available paths, the nature of the routing decisions that would be made were data to be transmitted along that path. The internet may include MPLS links, and the topology information may identify that available path as involving an MPLS link, the selection data for biasing said selection towards that available path. Data may be routed between the individual networks in accordance with ISP peering agreements, and the topology information may pertain to an ISP peering agreement that is determinative of the nature of the routing decisions that would be made were data to be transmitted along that available path.

The network information may comprise topology information that has been manually configured.

The network information may pertain to a current state of at least one network node that forms part of at least one of the available paths.

The network information may comprise a measure of current resource availability for the at least one network node; and/or a performance metric indicative of the current performance of the at least one network node; and/or an indicator indicating whether or not the at least one network node is currently functioning correctly.

The type metrics may be assigned to network addresses associated with the available paths in accordance with the ICE protocol.

The higher quality available path selected for the media session may include a media relay server with the lower quality available path not including any media relay servers. The media relay server may be a TURN server with the lower quality path not including any TURN servers.

The higher quality available path selected for the media session may include a network address translator with the lower quality available path not including any network address translators.

A second aspect is directed to a computer program product comprising code stored on a computer-readable storage medium configured when executed to implement a method for effecting a media session between an initiating endpoint and a responding endpoint connected via a communication network which includes network nodes, there being a plurality of available paths through the network via which the media session could be established, the method comprising: accessing type metrics associated with the available paths which convey the directness of the available paths, the type metrics for making a selection of an available path for the media session; receiving selection data for influencing said selection, the selection data generated based on network information indicative of the quality of the available paths, the network information collected from a plurality of network nodes and comprising contributions from network nodes other than the initiating and receiving endpoints which have current and/or have had past visibility of at least parts of the available paths; based on the selection data, selecting for the media session a higher quality but less direct available path in favour of a lower quality but more direct available path, wherein the media session is established via the selected path.

The method may further comprise: detecting, during the media session, a reduction in the quality of the selected path; and selecting a new available path in response, the media session continued via the newly selected path.

The selection data may be generated further based on local telemetry information held at at least one of the initiating and responding endpoints, the local telemetry information gathered for at least one previous media session in which that endpoint has previously participated.

The method may comprise assigning priorities to the available paths based on the type metrics and the selection data, wherein the higher quality available path has a higher priority than the lower quality available path and is selected on that basis.

The method may comprise assigning priorities to the available paths based at least on the type metrics and generating a set of available paths, wherein the step of selecting is restricted to selection from that set, and the lower quality available path is removed from that set prior to the step of selecting so as to cause the higher quality available path to be selected instead.

A third aspect of the subject matter is directed to a user device for effecting a media session between the user device and another endpoint via a communication network, there being a plurality of available paths through the network via which the media session could be established, the user device comprising: an access component configured to access type metrics assigned to the available paths which convey the directness of the available paths, the type metrics for making a selection of an available path for the media session; an input configured to receive selection data for influencing said selection, the selection data generated based on network information indicative of the quality of the available paths, the network information collected from a plurality of network nodes and comprising contributions from network nodes other than the user device and the other endpoint which have current and/or have had past visibility of at least parts of the available paths; a path selection component configured, based on the selection data, to select for the media session a higher quality available but less direct path in favour of a more direct but lower quality available path, wherein the media session is established via the selected path.

A fourth aspect is directed to a computer-implemented method for effecting a media session between an initiating endpoint and a responding endpoint via a communication network, the method comprising implementing at a computer of at least one of the initiating endpoint and responding endpoint the following steps: generating at the endpoint a set of candidate pairs, each comprising a respective network address available to the initiating endpoint and a respective network address available to the responding endpoint by exchanging network addresses between the initiating endpoint and the responding endpoint, the media session established using a candidate pair of the set determined to be valid by applying the following steps: receiving at the endpoint selection data pertaining to at least one of the network addresses and indicative of the quality of a path through the network that would be traversed were that network address to be used for the media session; receiving a respective type metric associated with each network address and indicative of the directness of a path through the network that would be traversed were that network address to be used for the media session; and the endpoints performing connectivity checks for at least one candidate pair of the set to determine whether or not the candidate pair is valid, wherein the at least one candidate pair is selected in dependence on the type metrics and the selection data.

A fifth aspect is directed to a computer for effecting a media session between an initiating endpoint and a responding endpoint via a communication network, the computer embodied at one of the initiating endpoint and responding endpoint, the computer comprising: a candidate pair generation component configured to generate a set of candidate pairs, each comprising a respective network address available to the initiating endpoint and a respective network address available to the responding endpoint by exchanging network addresses between the initiating endpoint and the responding endpoint, the media session established using a candidate pair of the set determined to be valid by applying the following steps: i) receiving at the endpoint selection data pertaining to at least one of the network addresses and indicative of the quality of a path through the network that would be traversed were that network address to be used for the media session, ii) receiving a respective type metric associated with each network address and indicative of the directness of a path through the network that would be traversed were that network address to be used for the media session, and iii) the endpoints performing connectivity checks for at least one candidate pair of the set to determine whether or not the candidate pair is valid, wherein the at least one candidate pair is selected in dependence on the type metrics and the selection data.

At least part of the selection data may be received via the communication network and/or at least part of the selection data may be generated based on network information held locally at the endpoint.

A sixth aspect is directed to a computer program product for effecting a media session between an initiating endpoint and a responding endpoint via a communication network, the computer program product comprising code stored on a computer readable storage medium and configured when executed on a computer of one of the initiating endpoint and responding endpoint to cause the following steps to be performed: generating at the endpoint a set of candidate pairs, each comprising a respective network address available to the initiating endpoint and a respective network address available to the responding endpoint by exchanging network addresses between the initiating endpoint and the responding endpoint, the media session established using a candidate pair of the set determined to be valid by applying the following steps: receiving at the endpoint selection data pertaining to at least one of the network addresses and indicative of the quality of a path through the network that would be traversed were that network address to be used for the media session; receiving a respective type metric associated with each network address and indicative of the directness of a path through the network that would be traversed were that network address to be used for the media session; and the endpoints performing connectivity checks for at least one candidate pair of the set to determine whether or not the candidate pair is valid, wherein the at least one candidate pair is selected in dependence on the type metrics and the selection data.

In embodiments, the type metrics are associated with the network addresses in accordance with the ICE protocol.

A respective first pair priority may be assigned to each of the candidate pairs in dependence on the type metrics and the selection data, the at least one candidate pair selected in favour of another candidate pair in the set having a lower first pair priority than the at least one candidate pair, the at least one candidate pair selected on that basis. A respective second pair priority may be assigned to each of the candidate pairs in dependence on the type metrics, wherein the second pair priorities are independent of the selection data, the first pair priorities assigned by modifying the second pair priorities in dependence on the selection data, the at least one candidate pair having a lower second pair priority but higher first pair priority than the other candidate pair. The second pair priorities may be assigned in accordance with the ICE protocol.

A candidate pair may be removed from the set in dependence on the selection data, wherein no connectivity check is performed for the removed candidate pair, the at least one candidate pair selected in dependence on the type metrics and in place of the removed candidate pair.

The media session may be established to establish a real-time communication event between the initiating endpoint and the responding endpoint. The real-time communication event may be a voice and/or video call.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
accessing network information indicative of the quality of available paths between a first endpoint device and a second endpoint device over a network, the network information collected from a plurality of network nodes and comprising contributions from one or more user devices other than the first endpoint device and the second endpoint device and which have one or more of current or past visibility of at least a portion of the available paths;
generating selection data that indicates a selected path between the first endpoint device and the second endpoint devices for routing a media session, the selected path based on an ordering of the available paths that prioritizes the quality of the available paths over directness of the available paths,
wherein the directness of the available paths is determined based at least in part on whether transmitting media session data on each respective available path includes processing of the transmitted data while in transit between the first endpoint device and the second endpoint device below a transport layer at a respective device, and
wherein a respective available path which includes more processing of the transmitted data at or above the transport layer at a respective device is less direct compared to another respective available path which includes less processing of the transmitted data than the respective available path at or above the transport layer at a respective device; and
transmitting the selection data to at least one of the first endpoint device or the second endpoint device to cause the at least one of the first endpoint device or the second endpoint device to attempt use of the selected path for the media session before use of another path of the available paths, wherein the selected path has a higher quality than the another path, but is a less direct path between the first endpoint device and the second endpoint device than the another path.

2. The method of claim 1 wherein the network information comprises telemetry gathered from previously established media sessions.

3. The method of claim 1 wherein the network information comprises telemetry gathered from previously established media sessions and wherein at least part of the telemetry has been gathered from a media session that was previously established via a path which overlaps one of the available paths.

4. The method of claim 3 wherein a first part of the telemetry has been gathered from a first media session previously established via at least a portion of the first path, and a second part of the telemetry has been gathered from a second media session previously established via at least a portion of the another path.

5. The method of claim 1 wherein the network is an internet in which data is routed between individual networks of the internet, and the network information comprises topology information which conveys, for at least one of the available paths, the nature of the routing decisions that would be made were data to be transmitted along that path.

6. The method of claim 5 wherein the internet includes a Multiprotocol Label Switching (MPLS) link, and the topology information identifies that available path as involving the MPLS link.

7. The method of claim 5 wherein data is routed between the individual networks in accordance with Internet Service Provider (ISP) peering agreements, and the topology information pertains to an ISP peering agreement.

8. The method of claim 1 wherein type metrics indicating the directness of the available paths are assigned to network addresses associated with the available paths in accordance with an Interactive Connectivity Establishment (ICE) protocol.

9. The method of claim 1 wherein the first path includes a media relay server and the another path does not include a media relay server.

10. The method of claim 9 wherein the media relay server is a Traversal Using Relay NAT (TURN) server and the another path does not include a TURN server.

11. The method of claim 1 wherein the first path includes a network address translator (NAT) and the lower quality available path does not include any network address translators.

12. The method of claim 1, wherein the directness of the available paths is received as values generated in accordance with a static priority scheme, and wherein a functionality of the network is organized into hierarchical layers and the values represent an inverse relationship between directness of a respective available path and whether said transmission of data on the respective available path includes said processing of the transmitted data at a higher layer of the network while in transit between the first endpoint device and the second endpoint device.

13. The method of claim 1, wherein a functionality of the network is organized into hierarchical layers and said processing of the transmitted data while in transit between the first endpoint device and the second endpoint device includes causing the transmitted data to traverse a higher layer of the network than a layer of the network at which the transmitted data is sent or received by the first endpoint device or the second endpoint device.

14. The method of claim 1, wherein at least a portion of the network is a packet-based network and the transmitted data includes data packets comprising a header and payload, and wherein said processing of the transmitted data while in transit between the first endpoint device and the second endpoint device includes modifying one or more of the payload of the data packets or the header of the data packets.

15. The method of claim 1, wherein the first endpoint device or the second endpoint device uses the selection data to establish the selected path to route communications between the first and second endpoint devices, wherein the first endpoint device or the second endpoint device selects the selected path, using the ordering of the available paths, based on the higher quality of the selected path relative to the another path.

16. A computer-readable storage medium excluding a transitory signal including code stored thereon that, responsive to execution by at least one processor of a computing system, cause the computing system to perform operations comprising:
accessing type metrics associated with available paths between a first endpoint device and a second endpoint device for establishing a media session between the first endpoint device and the second endpoint device over a network, the type metrics indicating directness of the available paths,
wherein the directness of the available paths is determined based at least in part on whether transmitting media session data on each respective available path includes processing of the transmitted data while in transit between the first endpoint device and the second endpoint device below a transport layer at a respective device, and
wherein a respective available path which includes more processing of the transmitted data at or above the transport layer at a respective device is less direct compared to another respective available path which includes less processing of the transmitted data than the respective available path at or above the transport layer at a respective device;
receiving selection data that indicates available paths between the first endpoint device and the second endpoint device for routing the media session, the selection data indicating quality of the available paths and directness of the available paths, the selection data generated based on:
network information collected from one or more user devices other than the first endpoint device and the second endpoint device, the network information indicative of the quality of the available paths between the first endpoint device and the second endpoint device; and
the type metrics indicative of the directness of the available paths between the first endpoint device and the second endpoint device;
wherein the available paths in the selection data are ordered to prioritize the quality of the available paths over the directness of the available paths; and
based on the selection data, selecting for establishing the media session a first path that has a higher quality than a second path, but is a less direct path between the first endpoint device and the second endpoint device than the second path, wherein the media session is established via the selected first path, and wherein the selected first path is attempted before use of another path of the available paths.

17. The computer readable storage medium of claim 16, wherein the operations further comprise:
detecting, during the media session, a reduction in the quality of the selected first path; and
selecting a new available path in response, the media session continued via the newly selected path.

18. The computer readable storage medium of claim 16, wherein the selection data is generated further based on local telemetry information stored by one or more of the first endpoint device or the second endpoint device, the local telemetry information gathered for at least one previous media session in which the one or more of the first endpoint device or the second endpoint device previously participated.

19. The computer readable storage medium of claim 16, the operations further comprising assigning priorities to the available paths based on the type metrics and the selection data, wherein the first path has a higher assigned priority than the second path.

20. The computer readable storage medium of claim 16, the operations further comprising:
assigning priorities to each of the available paths based at least on the type metrics; and
generating a subset of the available paths based on the selection data, wherein said selecting is restricted to the subset, and the second path is removed from the subset based on the network information indicating that the quality of the second path is below a threshold quality.

21. A system comprising:

at least one processor, and one or more computer-readable storage media including instructions stored thereon that, responsive to execution by the at least one processor, cause the system to perform operations including:

accessing type metrics associated with available paths between a first endpoint device and a second endpoint device for establishing a media session between the first endpoint device and the second endpoint device over a network, the type metrics indicating directness of the available paths, wherein the directness of the available paths is determined based at least in part on whether transmitting media session data on each respective available path includes processing of the transmitted data while in transit between the first endpoint device and the second endpoint device below a transport layer at a respective device, and wherein a respective available path which includes more processing of the transmitted data at or above the transport layer at a respective device is less direct compared to another respective available path which includes less processing of the transmitted data than the respective available path at or above the transport layer at a respective device;

receiving selection data that indicates available paths between the first endpoint device and the second endpoint device for routing the media session, the selection data indicating quality of the available paths and directness of the available paths, the selection data generated based at least in part on network information indicating the quality of the available paths between the first endpoint device and the second endpoint device and the type metrics indicating the directness of the available paths between the first endpoint device and the second endpoint device, wherein the available paths in the selection data are ordered to prioritize the quality of the available paths over the directness of the available paths;

selecting for the media session, based on the selection data, a first path that has a higher quality than a second path but is a less direct path between the first endpoint device and the second endpoint device than the second path; and establishing the media session via the selected first path, wherein the selected first path is attempted before use of another path of the available paths.

* * * * *